{| |}
(12) United States Patent
Knodt

(10) Patent No.: US 8,712,916 B2
(45) Date of Patent: Apr. 29, 2014

(54) CREATING AND MANUFACTURING DOCUMENTS THAT INITIALLY EXCEED EQUIPMENT FINISHING CAPACITY

(71) Applicant: Ricoh Company, Ltd., Tokyo (JP)

(72) Inventor: Kurt Knodt, Los Altos, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/621,642

(22) Filed: Sep. 17, 2012

(65) Prior Publication Data

US 2013/0024311 A1 Jan. 24, 2013

Related U.S. Application Data

(63) Continuation of application No. 13/215,112, filed on Aug. 22, 2011, now Pat. No. 8,271,389, which is a continuation of application No. 11/653,660, filed on Jan. 12, 2007, now Pat. No. 8,004,713.

(51) Int. Cl.
*G06Q 99/00* (2006.01)

(52) U.S. Cl.
USPC .......................... 705/51; 705/26.5; 358/1.14

(58) Field of Classification Search
CPC ................................................. G06Q 30/0621
USPC .................................... 705/26.5, 51; 358/1.14
See application file for complete search history.

(56) References Cited

U.S. PATENT DOCUMENTS

| 5,419,541 | A | 5/1995 | Stevens |
| 5,465,213 | A | 11/1995 | Ross |
| 5,754,939 | A | 5/1998 | Herz et al. |
| 6,012,890 | A | 1/2000 | Celorio Garrido |
| 6,213,703 | B1 | 4/2001 | Garrido |
| 6,416,082 | B1 | 7/2002 | Gayoso |

(Continued)

FOREIGN PATENT DOCUMENTS

| JP | 2005071140 | 3/2005 |
| WO | WO 01/00423 A2 | 1/2001 |

(Continued)

OTHER PUBLICATIONS

Rao, "Electronic Books: A new Genre of Content Management", Central Leather Research Institute, Jun. 2003, 18 pages.*

(Continued)

*Primary Examiner* — James D Nigh
(74) *Attorney, Agent, or Firm* — Hickman Palermo Truong Becker Bingham Wong LLP; Edward A. Becker

(57) ABSTRACT

Techniques described herein overcome many of the issues that have previously made the printing of a single copy of a book from a digital version unattractive and infeasible. According to one embodiment of the invention, an automated mechanism such as a computer program automatically determines whether the spine thickness of a to-be-printed copy of a digital version of a book will exceed the specified maximum spine thickness that a specified binding or other finishing device can handle. In response to determining that the spine thickness will exceed the specified maximum spine thickness, the automated mechanism automatically splits the digital version of the book into two or more volumes such that, for each volume, the spine thickness of the printed version of that volume will be no greater than the specified maximum spine thickness that the specified binding or other finishing device can handle.

13 Claims, 18 Drawing Sheets

(56) References Cited

U.S. PATENT DOCUMENTS

| | | |
|---|---|---|
| 6,460,036 B1 | 10/2002 | Herz |
| 6,655,963 B1 | 12/2003 | Horvitz et al. |
| 6,704,733 B2 | 3/2004 | Clark et al. |
| 6,757,691 B1 | 6/2004 | Welsh et al. |
| 6,886,006 B1 | 4/2005 | Castle |
| 6,910,843 B2 | 6/2005 | Saw et al. |
| 6,963,850 B1 | 11/2005 | Bezos et al. |
| 2004/0205462 A1* | 10/2004 | Levine ............ 715/500 |
| 2004/0243604 A1 | 12/2004 | Gross |
| 2005/0060650 A1* | 3/2005 | Ryan et al. ............ 715/526 |
| 2005/0105134 A1 | 5/2005 | Moneypenny et al. |
| 2006/0018696 A1* | 1/2006 | Mori et al. ............ 399/407 |
| 2006/0120522 A1* | 6/2006 | Clark et al. ............ 380/201 |
| 2006/0293965 A1* | 12/2006 | Burton ............ 705/26 |

FOREIGN PATENT DOCUMENTS

| | | | |
|---|---|---|---|
| WO | WO2004/102308 A2 | * | 11/2004 |
| WO | WO2004102308 A2 | | 11/2004 |
| WO | WO2004102808 A2 | * | 11/2004 |

OTHER PUBLICATIONS

Amazon.com Press Release, Program Lowers Economic Barriers for Publishers While Increasing Selection for Amazon.com Customers, Washington—(Business Wire)—May 19, 2006—Amazon.com, Inc.—1 Page.

\* cited by examiner

FIG. 3

Traditional "offset" printed book

Multi-volume POD book
- Anamorphic scaling on spine
- Part identifier on cover and spine Traditional "offset" printed book Multi-volume POD book
- Reduction on spine
- Part identifier on cover and spine Traditional "offset" printed book Multi-volume POD book
- Reduction on spine
- Special multi-section cover Traditional "offset" printed book, catalog, manual, etc.

Multi-volume POD book
- Saddle-stitched (single cover sheet)
- Part identifier on cover Multi-volume POD book
- Dual staple (separate front and back cover pages)
- Part identifier on cover

CREATING AND MANUFACTURING DOCUMENTS THAT INITIALLY EXCEED EQUIPMENT FINISHING CAPACITY

RELATED APPLICATION AND CLAIM OF PRIORITY

This application is a Continuation of U.S. patent application Ser. No. 13/215,112, which will issue as U.S. Pat. No. 8,271,389, entitled "Creating and Manufacturing Documents That Initially Exceed Equipment Finishing Capacity", filed Aug. 22, 2011, which is a Continuation of U.S. patent application Ser. No. 11/653,660, now issued as U.S. Pat. No. 8,004,713, entitled "Creating And Manufacturing Documents That Initially Exceed Equipment Finishing Capacity", filed Jan. 12, 2007, the contents of which are incorporated by reference for all purposes as if fully set forth herein.

FIELD OF THE INVENTION

The invention relates to printing devices, and more specifically, to a technique or process for creating and manufacturing, from a digital version of a book or other document, a limited number of physical copies of that book or other document in a cost-effective manner.

BACKGROUND

Books are being digitized and released in digital format, making these books more accessible to Internet users. The focus of this digitization typically has been toward enabling online searching and viewing of the digitized books. A digital version of a book may originate from an original application format file that the publisher used to create the hardcopy printing of the book. Alternatively, a digital version of a book may be created by digitally scanning the printed book.

Support for printing high quality versions of such a digital version of a book generally has been a lower priority activity. Several issues may be seen as causing the support for printing such high quality versions to be a lower priority activity. Some of these issues include, for example, copyright issues, the higher cost of printing a digital version of a book, the complexity of a print-ready digital document, the lack of products that are focused on printing a single copy of a digital version of a book, the limitations of low cost finishing devices, etc. For these and other reasons, printing a single copy of a digital version of a book often has been seen as being unattractive and infeasible.

Traditionally, books have been printed on offset presses and have been assembled with specialized finishing equipment. To make the printing financially feasible, the number of copies to be printed has needed to be no less than ten thousand copies. In the traditional book manufacturing process, the printing and binding processes have been manually selected to accommodate the attributes of the book, such as the thickness of the book, the number of pages, the hardness of the cover of the book, the number of colors in the book, etc. The publisher and/or the author of the book typically have dictated the printing and binding processes.

With the advent of low-cost digital printing and finishing systems, the feasibility of profitably printing low volumes of books has increased. However, in order to provide the required automation and materials for low-cost book printing, these types of systems have suffered from constraints in many areas. Some of these constraints hamper the use of these systems in operating a successful book printing business. One typical constraint found in these types of systems is the limitation on the number of pages that can be bound into a single book. A binding device typically has a specified maximum allowable spine thickness of books that the device can bind. The spine thickness of a book may depend on the weight of the paper on which the book is printed. As a result, the maximum number of pages that a binding device can bind may vary based on the weight of the paper on which the book is printed. Additionally, a binding device may have other capacity attributes, such as a maximum number of sheets that the binding device can handle, for example. A binding device also may have other limits, such as the width of the binding tape (for tape binders), the length of the staple (for stapling binders), the maximum length of the stitch (for stitching binders), etc.

Under the traditional book printing process, books are specifically designed to have a specific thickness, binding type, and page count. The printing and finishing processes are selected based on these criteria.

However, digital versions of books typically are not designed to take into account any specific finishing device. As a result, digital versions of books, when printed, sometimes exceed the limitations (e.g., maximum spine thickness) of finishing devices (e.g., binding devices). Because of the limitations of finishing devices, digital versions of books are often not printed out and bound into a volume. Instead, digital versions are often kept only in digital form.

SUMMARY

According to one embodiment of the invention, a digital version of a document is automatically split into multiple volumes. According to such an embodiment of the invention, a limitation of a specified finishing device is determined, where the limitation of the finishing device prevents the finishing device from being able to finish a printed version of the entire document as a single volume. Based at least in part on the limitation of the specified finishing device, the digital version of the document is automatically split into multiple volumes, each of which the specified finishing device is capable of finishing despite the limitation.

According to one embodiment of the invention, a digital version of a document is prepared for printing. According to such an embodiment of the invention, a limitation of a specified finishing device is determined, where the limitation of the finishing device prevents the finishing device from being able to finish a printed version of an entire document given currently specified attributes of the document. Based at least in part on the limitation of the specified finishing device, one or more of the currently specified attributes of the digital version of the document are automatically adjusted to form an adjusted digital version of the document, so that the adjusted digital version of the document, when printed, does not exceed the limitation of the finishing device.

According to one embodiment of the invention, a book seller's server receives, over the Internet, from a user's browser, a request that identifies a book. In response to receiving the request, the server sends, over the Internet, toward the user's browser, a set of two or more different options for manufacturing the book. The server then receives, over the Internet, from the user's browser, the user's selection of a particular option from the two or more options. In response to receiving the user's selection of the particular option, the server causes the identified book to be manufactured in accordance with the attributes specified in the particular option.

BRIEF DESCRIPTION OF THE DRAWINGS

Embodiments are illustrated by way of example, and not by way of limitation, in the figures of the accompanying drawings in which like reference numerals refer to similar elements and in which:

FIG. 3 shows an example of a screen that a bookseller's website might present to a customer, according to an embodiment of the invention;

DETAILED DESCRIPTION

Figure 1:
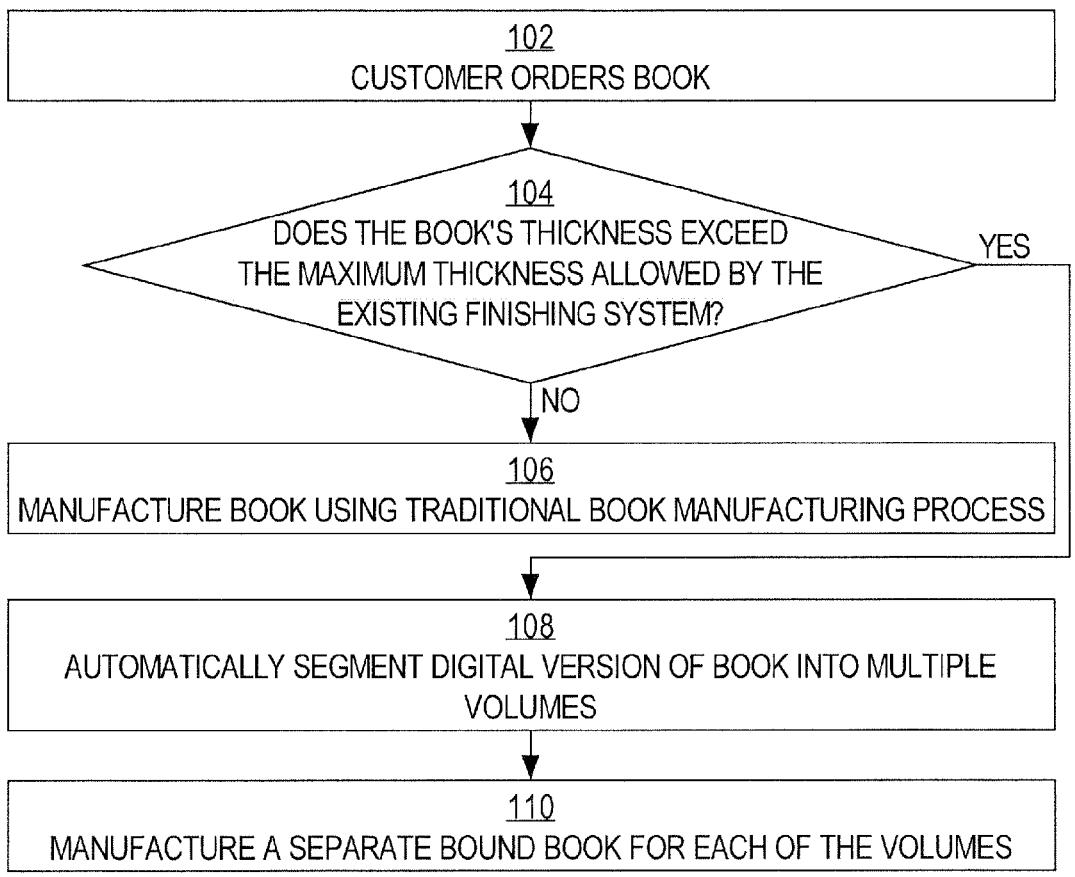
FIG. 1 is a flow diagram that depicts an example of a process for presenting options for manufacturing bound books from a digital version of a book, according to an embodiment of the invention.

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention. Although the term "book" is used in the descriptions below, embodiments of the invention which are applicable to "books" are, in some cases, equally applicable to documents other than "books." Such documents (e.g., documents printed or saved from web pages or databases) might or might not be bound. Therefore, wherever the term "book" is used in a description of an embodiment of the invention below, it should be recognized that the embodiment of the invention may be applied equally to documents other than books. The contents of U.S. patent application Ser. No. 11/653,660, which issues as U.S. Pat. No. 8,004,713 on Aug. 23, 2011, and which is titled "CREATING AND MANUFACTURING DOCUMENTS THAT INITIALLY EXCEED EQUIPMENT FINISHING CAPACITY," are incorporated by reference herein.

Overview

Using techniques described herein, existing digital book content is married with "print on demand" (also called "POD") digital book printing devices in order to enable cost efficient, limited quantity book printing. Techniques described herein improve the creation and manufacture of books that are printed from digital versions. Techniques described herein improve the creation and manufacture of such books given the limitations of less expensive existing systems regarding the maximum number of pages and the maximum spine thickness that those existing systems can handle. Techniques described herein overcome many of the issues that have previously made the printing of a single copy of a book from a digital version unattractive and infeasible.

According to one embodiment of the invention, an automated mechanism such as a computer program automatically determines whether the spine thickness of a to-be-printed copy of a digital version of a book will exceed the specified maximum spine thickness that a specified binding or other finishing device can handle. In response to determining that the spine thickness will exceed the specified maximum spine thickness, the automated mechanism automatically splits the digital version of the book into two or more volumes such that, for each volume, the spine thickness of the printed version of that volume will be no greater than the specified maximum spine thickness that the specified binding or other finishing device can handle. For example, if a specified binding device can only bind books with a maximum spine thickness of two inches, and if the automated mechanism determines that a to-be-printed copy of a digital version of a book will have a spine thickness of three inches, then the automated mechanism may split the digital version of the book into two separate volumes, the printed copies of each of which will have a spine thickness of one and a half inches. As a result, each volume can be bound separately by the specified binding device.

As used herein, the term "printing device" includes printers, copy machines, and multi-function peripherals (MFPs) (e.g., the Ricoh Aficio Color 5560 system).

In many printing and finishing systems, determining the thickness of a document is done by checking the number pages to be finished. So, for example, a printer with integrated finishing (e.g., a stapler) may limit the finishing to a maximum of 20 pages, because the printer knows that more than 20 pages will exceed the capacity of the integrated finishing device. Some embodiments of the invention consider the weight of the paper in determining whether a document exceeds a device's capacity, and some embodiments of the invention do not. The thickness of a document may be determined by counting a number of pages in the document. Some systems have mechanical or optical means for checking the thickness of a document.

Splitting a Digital Version of a Book into Volumes

As is discussed above, in one embodiment of the invention, when an automated mechanism determines that a printed version of a digital version of a book will, when printed, have a spine thickness that is thicker than the specified maximum spine thickness that a specified binding or other finishing device can handle, the automated mechanism automatically splits the digital version of the book into two or more volumes, each of which, when printed, will have a spine thickness that is no greater than the specified maximum spine thickness. There are several techniques by which a digital version of a book can be split automatically into volumes.

According to one embodiment of the invention, the automated mechanism splits a digital version of a book in a manner such that each resulting volume will begin with an odd page number rather than an even page number. According to one embodiment of the invention, the automated mechanism splits a digital version of a book in a manner such that no contents of any single page of the book end up being split between the resulting volumes—in other words, such that the digital version is split only on page boundaries indicated in the digital version.

According to one embodiment of the invention, a digital version of a book contains, for each chapter in the book, a digital marker that indicates where that chapter begins. In one embodiment of the invention, the automated mechanism splits a digital version of a book in a manner such that no contents of any single chapter of the book end up being split between the resulting volumes—in other words, such that the digital version is split only on chapter boundaries indicated in the digital version.

According to one embodiment of the invention, the automated mechanism determines the specified maximum spine thickness that a specified binding or other finishing device can handle. The automated mechanism then splits a digital version of a book into volumes such that the printed version of each volume, except possibly for the last volume, will be as close in thickness to the specified maximum spine thickness as is possible without requiring a page or chapter to be split between volumes. In such an embodiment of the invention, the number of resulting volumes may depend at least in part on the specified maximum spine thickness.

According to one embodiment of the invention, instead of making the printed version of each but the last volume as thick as allowable based on the specified maximum spine thickness, the automated mechanism attempts to split a digital version of a book such that the printed version of each of the resulting volumes will have approximately the same spine thickness as the printed versions of each of the other resulting volumes while preventing any page or chapter from being split between volumes. In such an embodiment of the invention, the automated mechanism may attempt to reduce the quantity of resulting volumes as much as possible while keeping the spine thicknesses of the printed versions of the volumes approximately equal. Again, in such an embodiment of the invention, the number of resulting volumes may depend at least in part on the specified maximum spine thickness.

In one embodiment of the invention, the automated mechanism splits a digital version of a book into multiple volumes such that the contents of the pages of the volumes are not different than the contents of the corresponding pages as they would have been formatted in the original book. For example, in one embodiment of the invention, the automated mechanism splits a digital version of a book into multiple volumes without changing any page size, page content, margin, font, font size, or line spacing. In other words, in one embodiment of the invention, the automated mechanism does not shrink or compress pages in order to accommodate a finishing device such as a binding device.

Automatically Splitting Saddle Stitched Books

Sometimes, the pages of a digital version of a book are represented in a manner such that when the pages of the book are printed, the printed pages can be "saddle stitched" together to form a bound book. In such a digital version, each sheet represents two whole pages—one page occupying the left side of the sheet and one page occupying the right side of the sheet. According to the "saddle stitching" binding technique, such printed sheets are stacked on top of each other and then sewed, stitched, stapled, or otherwise fastened together through the center of each of the sheets, such that the fastening mechanism divides each sheet into the two pages that occupy that sheet. The sheets are then folded along the center, at the location of the fastening mechanism, to form a book.

Automatically splitting, into multiple volumes, a digital version of a book that represents pages in this manner can be more complicated than automatically splitting a book in which each sheet represents a single page. Usually, most of the sheets of the digital version of a book that can be saddle stitched will not represent consecutive pages of the book. For example, the last sheet (which will sit on the bottom of the stack of sheets) might represent the first page of the book on the left side of the sheet and the last page of the book of the right side of the sheet. It might be that the only sheet that represents consecutive pages of the book is the sheet that will sit on top of the stack of sheets (typically the first sheet).

Therefore, according to one embodiment of the invention, a user provides, to the automated mechanism, input that specifies whether a digital version of a book represents pages in a saddle stitched configuration. In response to receiving user input that specifies that a digital version of a book represents pages in a saddle stitched configuration, and after determining a number of volumes into which the book should be split, the automated mechanism reconfigures the sheets of the digital version of the book so that each digital version of each volume can be saddle stitched when printed. Such reconfiguration may involve relocating pages from sides of sheets to other sides of other sheets so that all of the pages that belong to a particular volume will be located on sheets that correspond to that volume.

For example, if a digital version of a book comprises 50 saddle stitchable sheets such that the fiftieth (bottom) sheet represents the contents of both the page 1 and page 100 (side by side) of the book, and if the automated mechanism determines that the book should be split into two volumes of 25 saddle stitchable sheets each, then the automated mechanism may reconfigure the page contents on all 50 sheets before splitting the digital version of the book into volumes. In this example, the automated mechanism might relocate the page contents among the sheets so that the contents of the first 50 pages (pages 1-50) are represented on the first 25 sheets and so that the contents of the second 50 pages (pages 51-100) are represented on the second 25 sheets. Thus, in this example, after the reconfiguration, the twenty-fifth sheet would represent the contents of pages 1 and 50, side by side, and the fiftieth sheet would represent the contents of pages 51 and 100, side by side.

Suggested Volume Markers Embedded in the Digital Version

According to one embodiment of the invention, similar to the way that a digital version of a book may contain digital markers that indicate page and/or chapter boundaries in the book, a digital version of a book may contain digital markers that indicate suggested points at which the book might be split into volumes most appropriately. Such digital volume markers might be added to the digital version of the book by the creator of the digital document. Alternatively, a user might use a marking mechanism such as a computer program to edit an existing digital document and insert such digital volume markers into the existing digital document. Digital volume markers may be inserted into a digital version of a book by users other than the user who will ultimately print the volumes of the book, or by the user who will ultimately print the volumes of the book. When the digital version of the book is transferred from one storage device to another, the digital volume markers may remain embedded in the digital version of the book.

Later, if the automated mechanism determines that the book should be split into multiple volumes in order to accommodate the limitations of a specified finishing device, the automated mechanism may automatically select, from among all of the digital volume markers in the digital version of the book, one or more digital volume markers that indicate locations in the book such that if the book were split into volumes at those locations, each of the volumes would not exceed the limitations of the specified finishing device. Thus, even in cases where the automated mechanism automatically chooses the location(s) within a digital version of a book at which the digital version will be split into volumes, the automated mechanism's choice may be guided by the previous suggestions of human users represented by the digital volume markers embedded within the digital version of the book.

Figure 12:
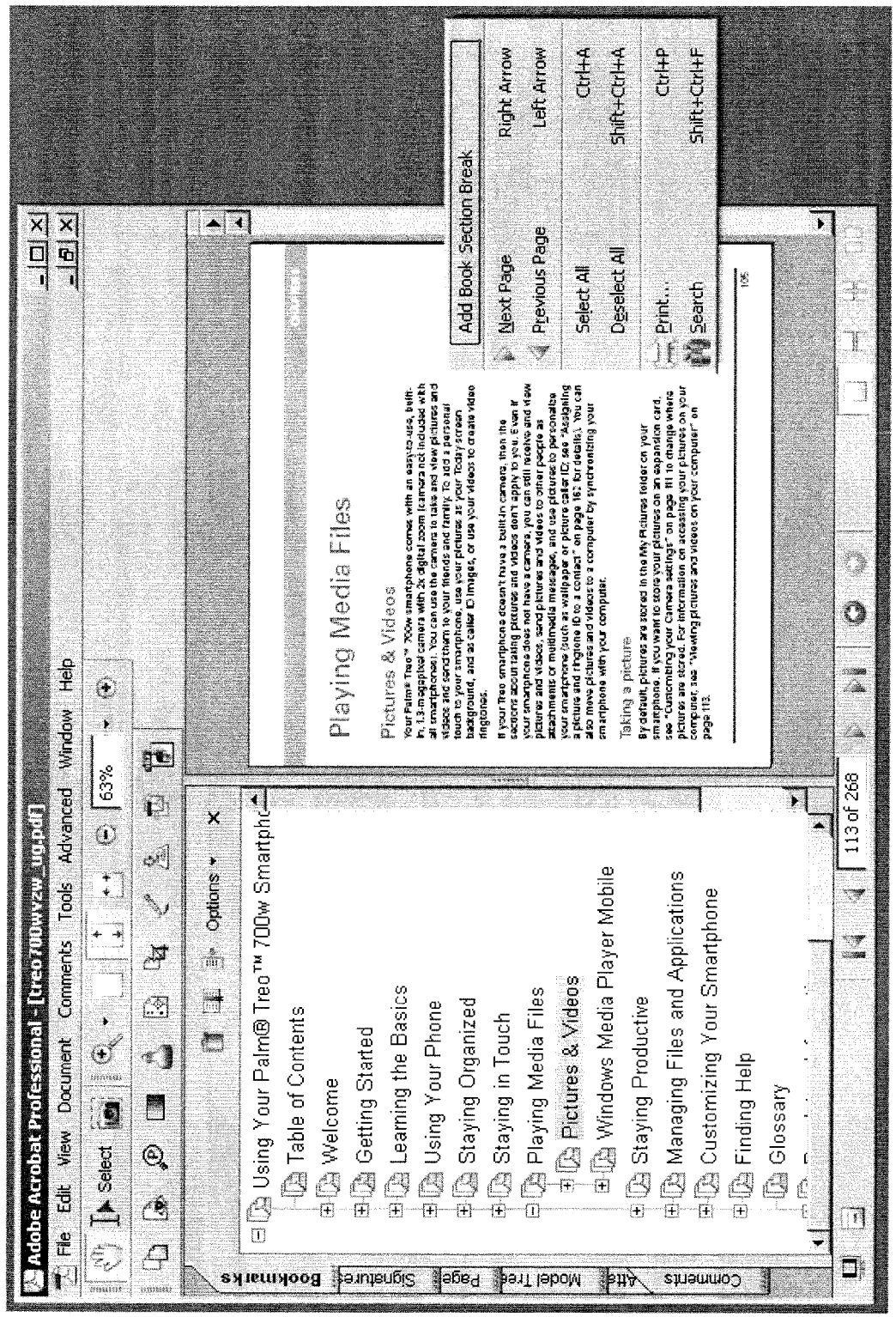
FIG. 12 illustrates an example of a user interface by which a human user might insert suggested digital volume markers into an existing digital version of a book, according to an embodiment of the invention.

FIG. 12 illustrates an example of a user interface by which a human user might insert suggested digital volume markers into an existing digital version of a book, according to an embodiment of the invention. For example, to insert a digital volume marker, a user might right click with his mouse while the mouse pointer is positioned at the location in the book at which the user would like to insert the marker. In response, the user interface may present a pop-up menu from which the user can select an option such as "add section break." In response to selecting this option, a suggested digital volume marker may be inserted into the digital version of the book at the designated location.

Splitting into Volumes Based on Shipping Cost Considerations

Often, a customer who orders a book to be printed on demand from a digital version will be ordering the book via a remote website. As a result, the customer often will not be able to pick up the bound copies of the volumes in person; instead, the website's operator will need to ship the bound copies of the volumes to the customer using some shipping service (e.g., a government operated postal service). Some postage cost may be associated with the shipping.

In one embodiment of the invention, a digital version of a book is automatically split into multiple volumes in a manner that takes into account postage costs that will be required to ship resulting volumes if the book is split in various ways. In one embodiment of the invention, the automated mechanism automatically attempts to split the digital version of the book in a way that will minimize the postage and/or other shipping costs. In one embodiment of the invention, the automated mechanism automatically attempts to split the digital version of the book in a way that will minimize the amount of time required to ship the printed version of the book.

For example, the automated mechanism may estimate, for each resulting volume, a maximum possible weight that the volume will weigh if the volume is made to be a certain thickness. The automated mechanism may attempt to split the digital version of the book in a way that keeps the estimated maximum weight of each volume below a certain weight threshold at which postage and/or shipping costs are known to increase. By keeping the weight of each volume below a specified threshold, resulting bound volumes sometimes may be shipped separately at lower costs than if those volumes were shipped together within a single package.

The automated mechanism may consider factors other than weight when attempting to split a digital version of a book in a way that will reduce postage and/or shipping costs. For example, the automated mechanism may base the generation of the multiple resulting volumes at least in part on the physical dimensions (i.e., height, width, and length) of those volumes. Sometimes, a package with dimensions that exceed a specified threshold will cost more to ship than a package with dimensions that do not exceed this threshold. Thus, the automated mechanism may attempt to generate resulting volumes in a manner such that the dimensions of each of those volumes will not exceed such a threshold.

Automatically Customized Cover Pages for Volumes

In one embodiment of the invention, when a digital version of a book is split into two or more volumes as described above, the automated mechanism modifies the digital version of each of the resulting volumes so that each digital version contains a customized cover page. In one embodiment of the invention, each customized cover page added to a digital version of a resulting volume by the automated mechanism specifies the order of that volume within the set of volumes (e.g., volume one, volume two, etc.). Additionally, in one embodiment of the invention, each such customized cover page also specifies the total number of resulting volumes in the set (e.g., volume one of seven, volume two of seven, etc.). The automated mechanism may generate each customized cover page automatically.

Integrated and Separate Finishing Devices

Finishing devices, such as binding devices, sometimes are integrated into a complex printing device that prints the digital version of the book (e.g., as two or more volumes) and then automatically binds the printed version of the book (e.g., as two or more volumes). Alternatively, finishing devices may be simple, single-function devices that are entirely separate from the printing device that prints the digital copy of the book.

In one embodiment of the invention, separate volumes of a digital version of a book are printed concurrently on separate printing devices. A user may take the printed pages produced by a printing device and feed those printed pages to a separate finishing device. In one embodiment of the invention, separate volumes of a digital version of a book are output by a single printing device into separate output trays of that printing device. A user may take a printed volume from such a tray and feed that printed volume to a finishing device that is separate from the printing device. The user may feed the contents of each of the printing device's output trays, each of which holds a separate printed volume, to the finishing device separately.

Alternatively, a single printing device may output the printed version of each volume to the same output tray, but collate the printed versions of the volumes relative to each other so that each stack of pages that comprises a volume is offset from the stacks of pages immediately above and below, if any. Additionally, each stack may be prefaced by an automatically generated (not part of the original digital version of the book), customized cover sheet that indicates which volume of the book that stack represents.

A user may provide, as input to the automated mechanism that splits the digital version of a book, an identity of a target finishing device and/or the limiting characteristics of that target finishing device. Based on the user input, the automated mechanism may split or otherwise format the digital version of a book so that each resulting volume can be handled without difficulty by the target finishing device.

Automatic Spine and Cover Graphic Modification

When a book is split up into two or more volumes, the spines of each of those volumes, when bound, will be less thick than the spine of the printed version of the entire book would have been. According to one embodiment of the invention, the automated mechanism automatically modifies the digital version of the cover of each resulting volume so that the cover, when folded, will have a spine that is of a thickness that fits the stack of printed pages of that resulting volume.

"Perfect binding" refers to a process whereby a cover of a book is printed as a single "wraparound" sheet that is at least as tall as the height of a single page of the book, but is as wide as the width of at least two pages of the book plus the thickness of the spine of the book. When the wraparound sheet is folded and wrapped around the stack of pages that the book comprises, part of the wraparound sheet forms the back cover of the book, part of the wraparound sheet forms the spine of the book, and part of the wraparound sheet forms the front cover of the book. Sometimes, the digital version of the book includes a digital version of this wraparound sheet, which sometimes contains graphics and/or text on the front cover and/or spine areas. In one embodiment of the invention, the automated mechanism determines an appropriate width for the wraparound sheet given the calculated thickness of the printed book, and instructs a finishing device to cut or trim the wraparound sheet to the appropriate width.

In one embodiment of the invention, when a digital version of a book is split into multiple volumes as described above, the automated mechanism generates and places a modified version of the wraparound page into the digital version of each resulting volume. In one embodiment of the invention, for each such volume, the automated mechanism modifies the width of the spine portion of the wraparound sheet for that volume so that the width of the spine portion will fit the thickness of the printed version of that volume. Inasmuch as the printed version of each volume may be of a different thickness, the width of the spine portion of the wraparound sheet for each version may differ.

In one embodiment of the invention, when the automated mechanism modifies the width of the spine portion of a wraparound page for a particular volume, the automated mechanism also automatically compresses the text and/or graphics on the spine portion so that they will still fit on the reduced-thickness spine. For example, if the automated mechanism reduces the width of the spine portion by 75%, then the automated mechanism may automatically and proportionately compress the text and/or graphics on the spine portion so that the text and/or graphics are 75% as wide as the original text and/or graphics on the original unmodified spine portion. For example, text that runs across the long part of the spine may be compressed in height so that the letters of the text are not as tall as they would have been on the original, uncompressed spine. If the length of the spine is unchanged, then the letters of the text may remain as wide as they would have been on the original, uncompressed spine.

In one embodiment of the invention, the automated mechanism adds, to the spine portion of each volume's wraparound sheet, a graphical indicator of the order of that volume within the set of volumes (e.g., vol. 1, vol. 2, etc.). Additionally, in one embodiment of the invention, the automated mechanism adds, to the spine portion of each volume's wraparound sheet, a graphical indicator of the total number of resulting volumes in the set (e.g., vol. 1/7, vol. 2/7, etc.).

In one embodiment of the invention, the automated mechanism also modifies the front cover portion of each volume's wraparound sheet. Specifically, in one embodiment of the invention, the automated mechanism adds, to the front cover portion of each volume's wraparound sheet, a graphical indicator of the order of that volume within the set of volumes (e.g., volume one, volume 2, etc.). Additionally, in one embodiment of the invention, the automated mechanism adds, to the front cover portion of each volume's wraparound sheet, a graphical indicator of the total number of resulting volumes in the set (e.g., volume one of seven, volume two of seven, etc.).

Thus, in one embodiment of the invention, the wraparound sheets into which the different resulting volumes are bound are identical to each other except with respect to (a) the width of the spine portion, (b) the extent of compression of the text and/or graphics on the spine portion, and (c) spine portion markings and/or front cover portion markings that identify the order of the corresponding volume in the set of volumes.

As a result, in one embodiment of the invention, the resulting volumes, when bound, have a uniform, visually pleasing appearance that is similar to the appearance of the original single book.

In one embodiment of the invention, if the original digital version of a book does not contain a digital version of a wraparound sheet as described above, then the automated mechanism automatically generates a digital version of a wraparound sheet for each of the digital versions of the resulting volumes. In one embodiment of the invention, the automated mechanism accepts user input that identifies digital content that the automated mechanism is to use to generate the digital versions of the wraparound sheets.

Automatically Changing Attributes of a Book to Allow Finishing by an Available Finishing Device In one embodiment of the invention, in response to a determination that no available finishing device can handle the thickness of a book that will be printed from a digital version of that book, attributes of the digital version are automatically changed so that the book can be handled by an available finishing device when the book is printed.

For example, in order to reduce the thickness of the printed copy of the book, an automated mechanism might change, in the digital version of the book, a specified paper type on which the book is to be printed. As a result, the contents of the book may be printed on a thinner type of paper, thus reducing the printed copy's overall thickness.

For another example, in order to reduce the thickness of the printed copy of the book, an automated mechanism might change, in the digital version of the book, a font size and/or font type of a font in which the content of the book is written. As a result, the contents of the book may be printed on a fewer sheets, thus reducing the printed copy's overall thickness.

For another example, in order to reduce the thickness of the printed copy of the book, an automated mechanism might decrease, in the digital version of the book, the size of the margins that surround the text on the pages of the book. As a result, the contents of the book may be printed on a fewer sheets, thus reducing the printed copy's overall thickness.

For another example, in order to reduce the thickness of the printed copy of the book, an automated mechanism might increase, in the digital version of the book, a sheet size of the sheets on which the pages of the book are to be printed. As a result, the contents of the book may be printed on a fewer sheets, thus reducing the printed copy's overall thickness.

For another example, in order to reduce the thickness of the printed copy of the book, an automated mechanism might decrease, in the digital version of the book, the distances between the lines of text in the book. As a result, the contents of the book may be printed on a fewer sheets, thus reducing the printed copy's overall thickness.

In all of the above examples, the automated mechanism might change the attributes of the book to a minimal extent necessary to allow an available finishing device to handle the finishing of the book. The automated mechanism may change the attributes of the book in a manner that preserves the original attributes of the book to the greatest extent possible. Where such a technique is used, it may be possible to avoid splitting the book into multiple volumes if such splitting is undesirable.

Example Techniques and Processes

FIG. 1 is a flow diagram that depicts an example of a process for presenting options for manufacturing bound books from a digital version of a book, according to an embodiment of the invention. In block 102, a customer orders a book. For example, a customer might order a book from a bookselling website via the Internet. The bookselling website might offer, to the customer, a feature by which the customer can request the printing of the book "on demand" from a digital version of the book. Digital versions of several different books might be stored in a database, for example.

In block 104, a determination is made as to whether the book's thickness exceeds the maximum thickness allowed by the existing finishing device (e.g., a binding device). For example, an automated mechanism at the bookselling website might determine whether the ordered book's printed thickness will be greater than the maximum thickness that a specified binding device can handle. The automated mechanism may make this determination based on (a) an identify of the specific binding device that will be used to bind the book, as identified by a human operator and (b) previously stored data that indicates, for each of several different known binding devices, the known maximum thicknesses that each of those binding devices can handle. Such data may be stored in a database, for example. If the book's thickness exceeds the maximum thickness, then control passes to block 108. Otherwise, control passes to block 106.

In block 106, the book is manufactured using the traditional book manufacturing process. For example, the bookselling website's computer may send the digital version of the book to an integrated printing/binding device to be printed and bound as a single volume. The bound book may be shipped to the customer's address.

Alternatively, in block 108, the digital version of the book is automatically segmented into multiple volumes. For example, an automated mechanism at the bookseller's website may automatically segment the digital version of the book into two or more volumes using any of the example processes described above. Control passes to block 110.

In block 110, a separate bound book is manufactured for each of the volumes. For example, the bookselling website's computer may separately send a digital version of each volume to an integrated printing/binding device to be separately printed and bound. The two or more resulting bound volumes may be shipped together to the customer's address.

Figure 2:
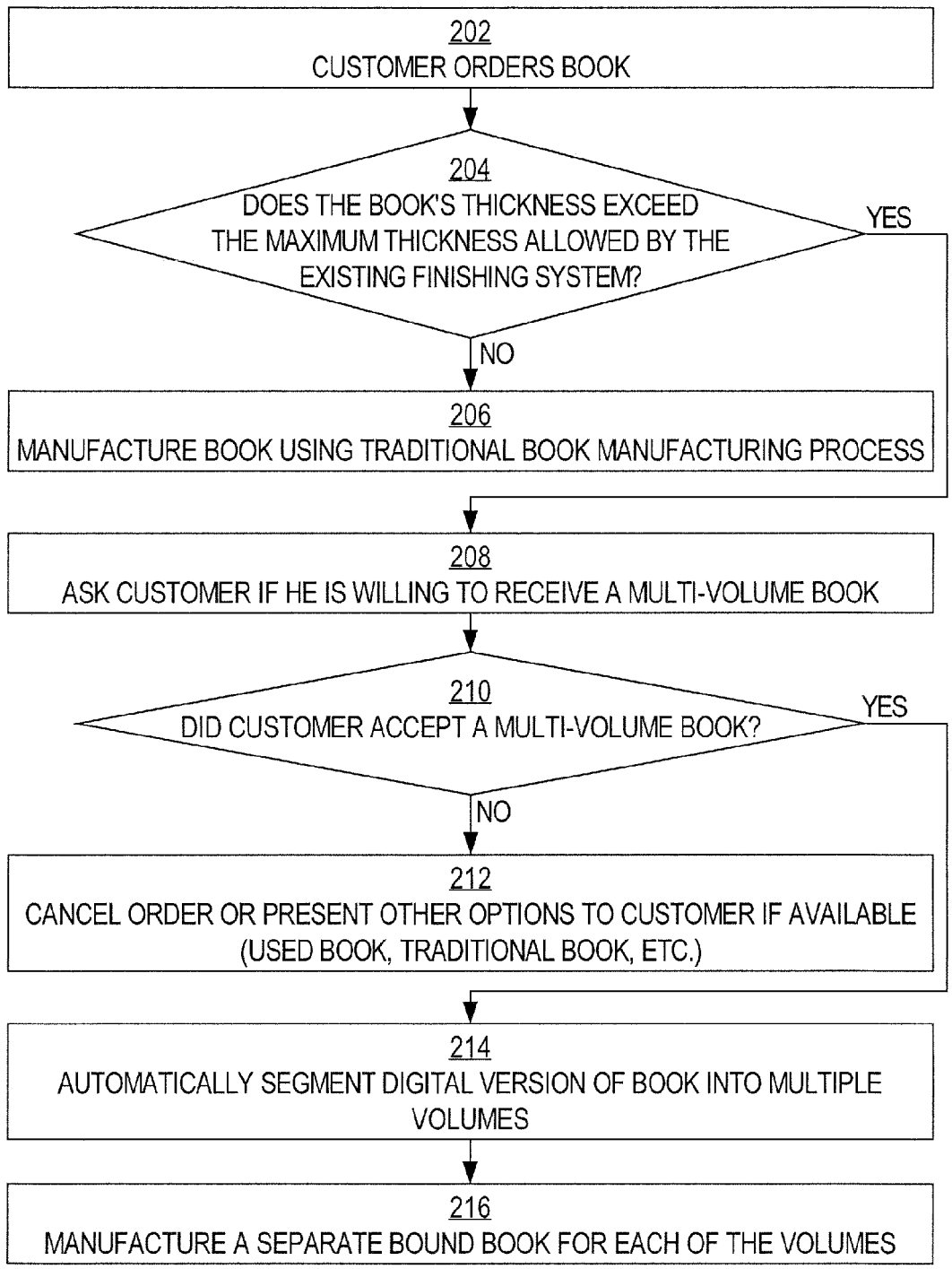
FIG. 2 is a flow diagram that depicts an alternative example of a process for presenting options for manufacturing bound books from a digital version of a book, according to an embodiment of the invention.

FIG. 2 is a flow diagram that depicts an alternative example of a process for presenting options for manufacturing bound books from a digital version of a book, according to an embodiment of the invention. In block 202, a customer orders a book. For example, a customer might order a book from a bookselling website via the Internet. The bookselling website might offer, to the customer, a feature by which the customer can request the printing of the book "on demand" from a digital version of the book.

In block 204, a determination is made as to whether the book's thickness exceeds the maximum thickness allowed by the existing finishing device (e.g., a binding device). For example, an automated mechanism at the bookselling website might determine whether the ordered book's printed thickness will be greater than the maximum thickness that a specified binding device can handle. The automated mechanism may make this determination based on (a) an identify of the specific binding device that will be used to bind the book, as identified by a human operator and (b) previously stored data that indicates, for each of several different known binding devices, the known maximum thicknesses that each of those binding devices can handle. If the book's thickness exceeds the maximum thickness, then control passes to block 208. Otherwise, control passes to block 206.

In block 206, the book is manufactured using the traditional book manufacturing process. For example, the bookselling website's computer may send the digital version of the book to an integrated printing/binding device to be printed and bound as a single volume. The bound book may be shipped to the customer's address.

Alternatively, in block 208, the customer is asked whether he is willing to receive a multi-volume book, and options are presented to the customer. For example, the bookselling website may ask the customer whether he is willing to have the book printed as a multi-volume set containing multiple bound volumes rather than as a single bound book. Control passes to block 210.

In block 210, a determination is made as to whether the customer accepted a multi-volume book. If the customer was willing to receive the book in the form of a multiple volume set, then control passes to block 214. Otherwise, control passes to block 212.

In block 212, either the book order is cancelled or the customer is allowed to choose another method of obtaining the book, if other methods are available. For example, if an already printed but used copy of the book is available, or if a mass manufactured copy of the book is available, then the bookseller's website may give the customer the option of purchasing such a copy. The bookseller's website also may give the customer the option of canceling the order entirely if no other option is available or if the customer is unwilling to accept any copy of the book other than an "on demand" printing of a digital version of the book.

Alternatively, in block 214, the digital version of the book is automatically segmented into multiple volumes. For example, an automated mechanism at the bookseller's website may automatically segment the digital version of the book into two or more volumes using any of the example processes described above. Control passes to block 216.

In block 216, a separate bound book is manufactured for each of the volumes. For example, the bookselling website's computer may separately send a digital version of each volume to an integrated printing/binding device to be separately printed and bound. The two or more resulting bound volumes may be shipped together to the customer's address.

Figure 3:
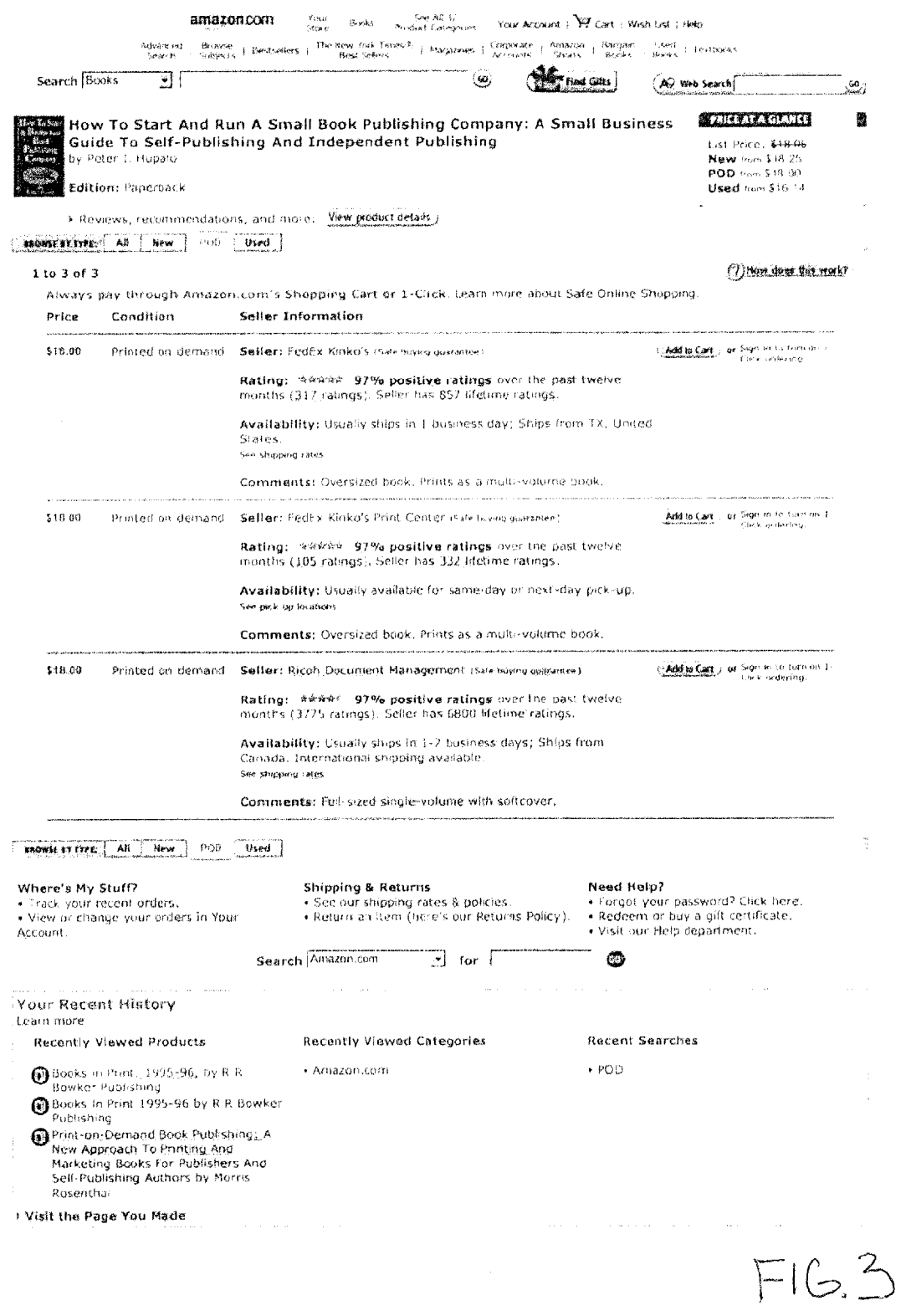

FIG. 3 shows an example of a screen that a bookseller's website might present to a customer, according to an embodiment of the invention. The screen shows several different options that can be used for manufacturing a particular book. According to one option, the book can be printed and bound by "FedEx Kinko's" as a multi-volume set. According to another option, the book can be printed and bound by "Ricoh Document Management" as a full-sized single volume book with a soft cover. Different print service vendors might be able to handle different maximum book thicknesses. In one embodiment of the invention, the customer can select a soft covered edition of a book, which an available binding device can bind due to the edition having a soft cover, rather than a multi-volume hard covered edition of the book. In one embodiment of the invention, a book seller's server receives, over the Internet, from a user's browser, a request that identifies a book. In response to receiving the request, the server sends, over the Internet, toward the user's browser, a set of two or more different options for manufacturing the book. Examples of such options are described herein, and may pertain to cover, binding, and size, for example. The server then receives, over the Internet, from the user's browser, the user's selection of a particular option from the two or more options. In response to receiving the user's selection of the particular option, the server causes the identified book to be manufactured in accordance with the attributes (cover, binding, size, etc.) specified in the particular option. For example, the server may automatically print and bind the book from a digital version using a printing and finishing device that the server selects based on that device's ability to print and bind the book with the attributes specified in the particular option.

Figure 4:
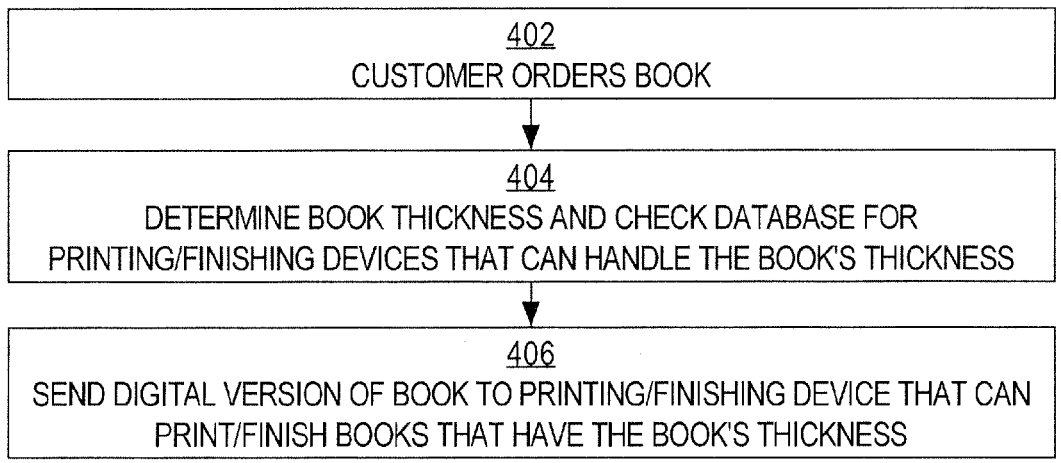
FIG. 4 is a flow diagram that depicts an example of a process for selecting a printing/finishing device to print/finish a book based on the book's thickness, according to an embodiment of the invention.

FIG. 4 is a flow diagram that depicts an example of a process for selecting a printing/finishing device to print/finish a book based on the book's thickness, according to an embodiment of the invention. In block 402, a customer orders a book. For example, a customer might order a book from a bookselling website via the Internet. The bookselling website might offer, to the customer, a feature by which the customer can request the printing of the book "on demand" from a digital version of the book.

In block 404, the book's thickness is determined and a database is checked for printing/finishing devices that can handle the book's thickness. For example, if the book is known to be three inches thick, then an automated mechanism (e.g., a computer program) might consult a database for available printing and/or finishing devices that can handle the printing and/or finishing (e.g., binding) of books that are three inches thick. The database may indicate, for each available printing/finishing device, the maximum thickness that the printing/finishing device can handle. The automated mechanism may select a printing/finishing device from among the available printing/finishing devices based at least in part on the data in the database.

In block 406, the digital version of the book is sent to an automatically selected printing/finishing device that can print/finish (e.g., bind) books that are at least as thick as the book that the customer ordered. The selected printing/finishing device prints and/or finishes (e.g., binds) the book. Thereafter, the printed and bound book may be shipped to the customer's address.

Although in one embodiment a printing/finishing device is automatically selected based on the maximum book thickness that the printing/finishing device can handle, in another embodiment of the invention, a print service vendor is automatically selected from among a set of print service vendors based on the maximum book thicknesses that each such print service vendor can handle, as indicated by data that is stored in a database. In such an embodiment of the invention, a digital version of the book is sent (e.g., via the Internet) to the selected print service vendor for printing and/or finishing (e.g., binding).

Figure 5:
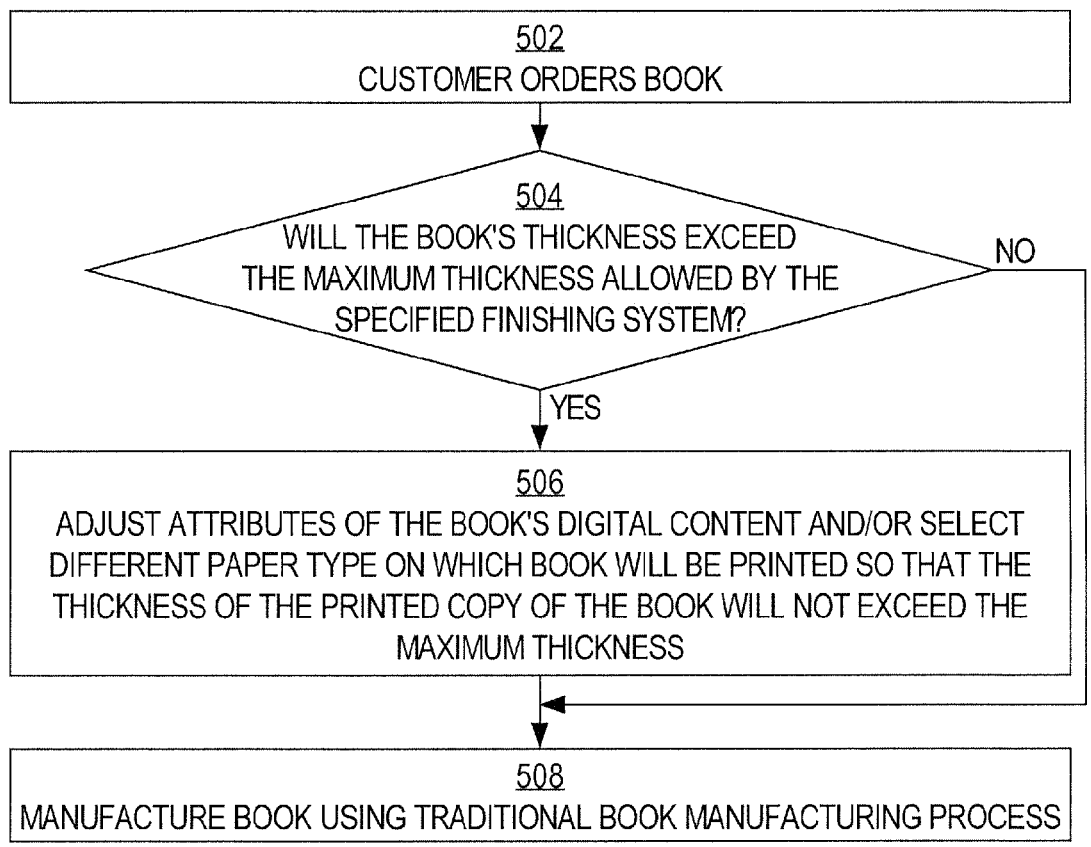
FIG. 5 is a flow diagram that depicts an example of a process for automatically modifying the attributes of a digital version of a book so that the finishing of the book can be handled by an available finishing device, according to an embodiment of the invention.

FIG. 5 is a flow diagram that depicts an example of a process for automatically modifying the attributes of a digital version of a book so that the finishing of the book can be handled by an available finishing device, according to an embodiment of the invention. In block 502, a customer orders a book. For example, a customer might order a book from a bookselling website via the Internet. The bookselling website might offer, to the customer, a feature by which the customer can request the printing of the book "on demand" from a digital version of the book.

In block 504, before the book is printed, a determination is made as to whether the thickness of a printed copy of the book will exceed the maximum thickness that can be handled by a specified printing/finishing device if the book is printed on a specified type of paper (i.e., with a specified thickness, height, and/or width). If the printed book's thickness will exceed the maximum thickness, then control passes to block 506. Otherwise, control passes to block 508.

In block 506, one or more attributes of the digital version of the book are automatically adjusted so that the thickness of the book, when printed, will not exceed the maximum thickness that can be handled by the specified printing/finishing device. For example, an automated mechanism may adjust paper type, paper size, font type, font size, margin size, line spacing, and/or other attributes specified in the digital version of the book prior to printing. After modification, the digital version of the book may be "re-flowed" so that the book's contents can be re-distributed among the book's pages based on the altered attributes. Control then passes to block 508.

In block 508, the book is manufactured using the traditional book manufacturing process. For example, the bookselling website's computer may send the digital version of the book to an integrated printing/binding device to be printed and bound as a single volume. The bound book may be shipped to the customer's address.

Figure 6:
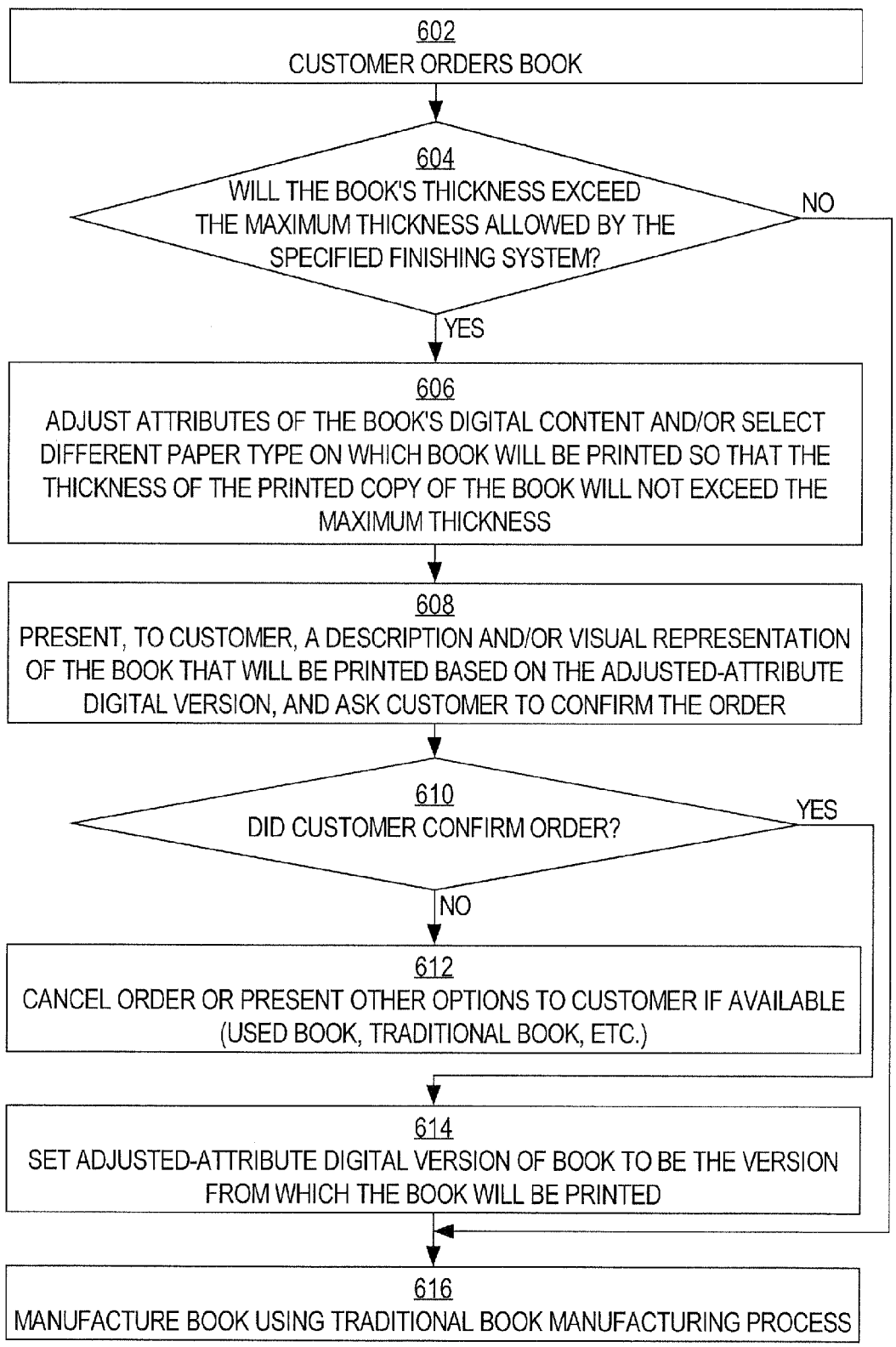
FIG. 6 is a flow diagram that depicts an alternative example of a process for automatically modifying the attributes of a digital version of a book so that the finishing of the book can be handled by an available finishing device, according to an embodiment of the invention.

FIG. 6 is a flow diagram that depicts an example of an alternative process for automatically modifying the attributes of a digital version of a book so that the finishing of the book can be handled by an available finishing device, according to an embodiment of the invention. In block 602, a customer orders a book. For example, a customer might order a book from a bookselling website via the Internet. The bookselling website might offer, to the customer, a feature by which the customer can request the printing of the book "on demand" from a digital version of the book.

In block 604, before the book is printed, a determination is made as to whether the thickness of a printed copy of the book will exceed the maximum thickness that can be handled by a specified printing/finishing device if the book is printed on a specified type of paper (i.e., with a specified thickness, height, and/or width). If the printed book's thickness will exceed the maximum thickness, then control passes to block 606. Otherwise, control passes to block 616.

In block 606, one or more attributes of the digital version of the book are automatically adjusted so that the thickness of the book, when printed, will not exceed the maximum thickness that can be handled by the specified printing/finishing device. For example, an automated mechanism may adjust paper type, paper size, font type, font size, margin size, line spacing, and/or other attributes specified in the digital version of the book prior to printing. After modification, the digital version of the book may be "re-flowed" so that the book's contents can be re-distributed among the book's pages based on the altered attributes. Control then passes to block 608.

In block 608, a description and/or visual representation of the book that will result when printed from the attribute-modified digital version is presented to the customer. The customer is asker to confirm the order. For example, the bookseller's website may present such a description and/or visual representation to the customer and ask the customer to indicate whether a printed copy matching that description and/or visual representation will be satisfactory to the customer. Control passes to block 610.

In block 610, a determination is made as to whether the customer confirmed the order of the attribute-adjusted copy of the book. If the customer confirmed the order, then control passes to block 614. Otherwise, control passes to block 612.

In block 612, either the book order is cancelled or the customer is allowed to choose another method of obtaining the book, if other methods are available. For example, if an already printed but used copy of the book is available, or if a mass manufactured copy of the book is available, then the bookseller's website may give the customer the option of purchasing such a copy. The bookseller's website also may give the customer the option of canceling the order entirely if no other option is available or if the customer is unwilling to accept any copy of the book other than an "on demand" printing of a digital version of the book.

Alternatively, in block 614, the digital version of the book in which the attributes of the book's content have been adjusted to allow the book to be printed/finished by the specified printing/finishing device is set to be the version from which the book will be printed (i.e., rather than the original, unadjusted digital version). Control passes to block 616.

In block 616, the book is manufactured using the traditional book manufacturing process. For example, the bookselling website's computer may send the digital version of the book to an integrated printing/binding device to be printed and bound as a single volume. The bound book may be shipped to the customer's address.

Figure 7:
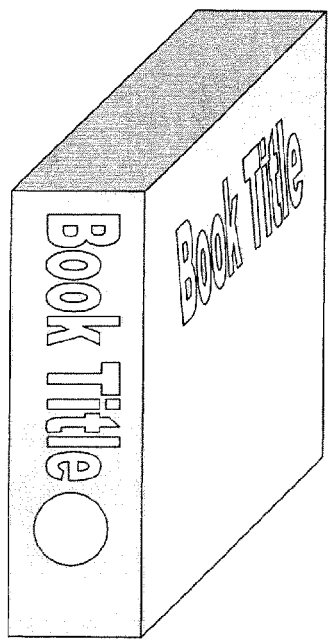
FIG. 7 illustrates an example of a single-volume book and multiple volumes of that book that may result from splitting the single volume into multiple volumes using techniques described herein, according to an embodiment of the invention.
Figure 7:
Figure 7:
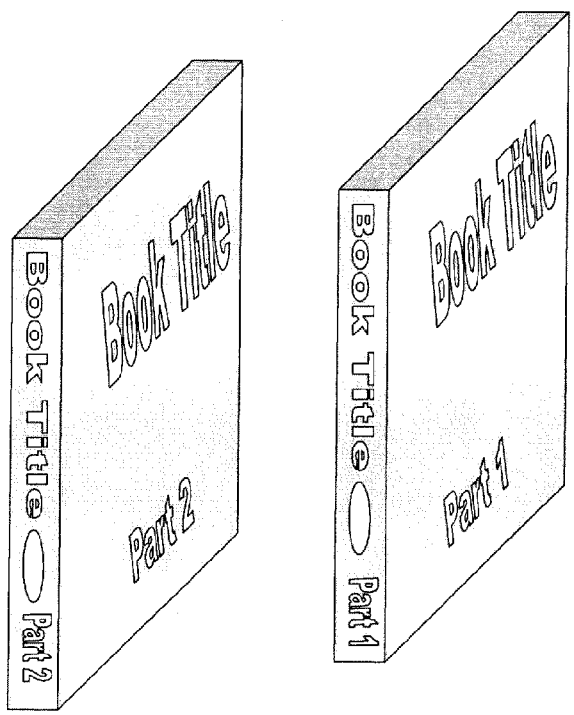

FIG. 7 illustrates an example of a single-volume book and multiple volumes of that book that may result from splitting the single volume into multiple volumes using processes described herein, according to an embodiment of the invention. As shown, the graphics and text on the spines of the resulting volumes have been compressed to fit the thinner spines, and volume numbers have been added to the spines and covers of the resulting volumes. In this case, the scaling of the text and graphics on the spine is anamorphic, such that the size of the text and graphics has been compressed in one dimension but retained in the other dimension.

Figure 8:
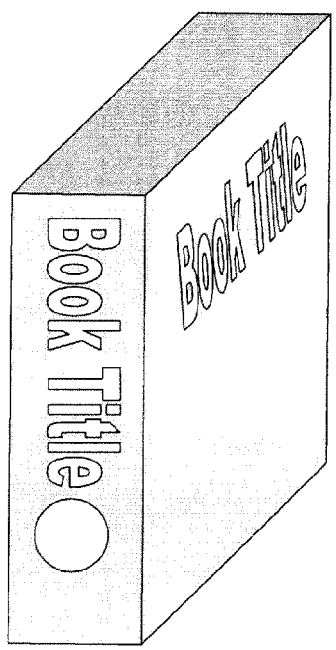
FIG. 8 illustrates another example of a single-volume book and multiple volumes of that book that may result from splitting the single volume into multiple volumes using techniques described herein, according to an embodiment of the invention.
Figure 8:
Figure 8:
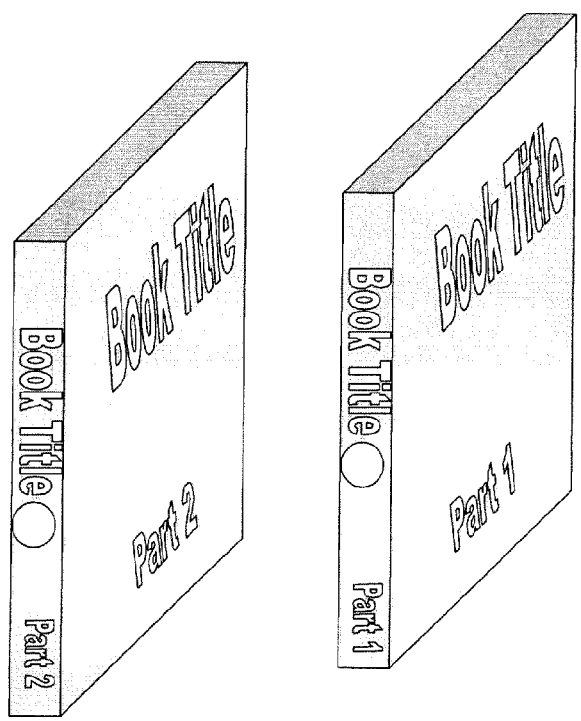

FIG. 8 illustrates another example of a single-volume book and multiple volumes of that book that may result from splitting the single volume into multiple volumes using processes described herein, according to an embodiment of the invention. As shown, the graphics and text on the spines of the resulting volumes have been compressed to fit the thinner spines, and volume numbers have been added to the spines and covers of the resulting volumes. In this case, the scaling of the text and graphics on the spine is proportional, such that the size of the text and graphics has been compressed in both dimensions.

Figure 9:
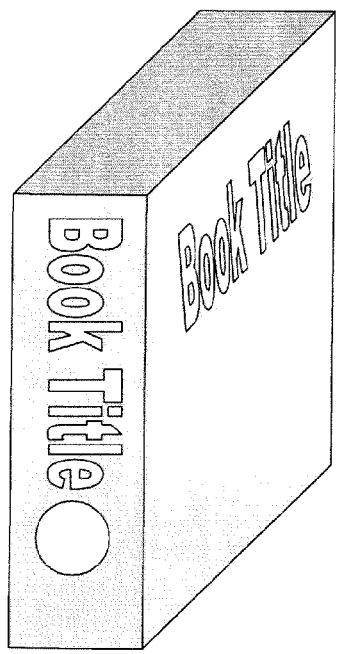
FIG. 9 illustrates another example of a single-volume book and multiple volumes of that book that may result from splitting the single volume into multiple volumes using techniques described herein, according to an embodiment of the invention.
Figure 9:
Figure 9:
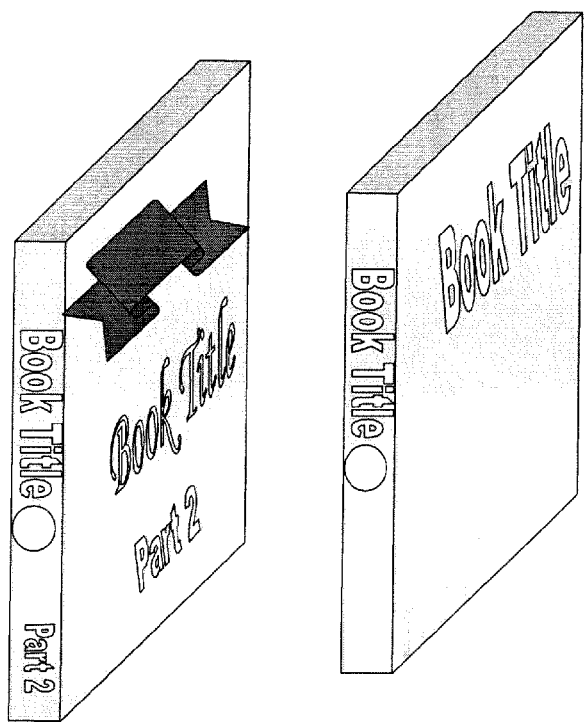

FIG. 9 illustrates another example of a single-volume book and multiple volumes of that book that may result from splitting the single volume into multiple volumes using processes described herein, according to an embodiment of the invention. As shown, the graphics and text on the spines of the resulting volumes have been compressed to fit the thinner spines. In this case, volume numbers have been added to the spines and covers of all of the resulting volumes except for the first volume. This is because, under some circumstances, customers may desire for the first volume's cover and/or spine to appear identical to the cover and/or spine of the original single-volume book. The covers of the volumes following the first volume also may have different and/or additional text and/or graphics than the cover of the first volume has.

Figure 10:
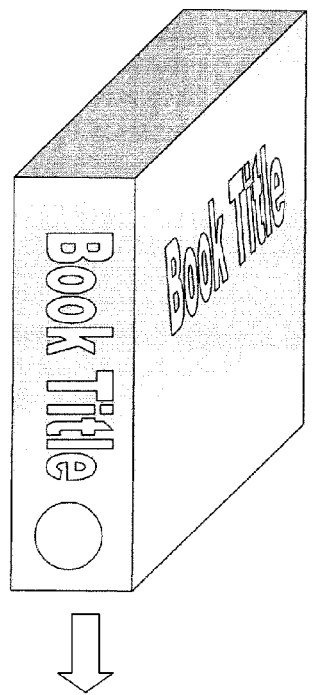
FIG. 10 illustrates some additional examples of a single-volume book and multiple volumes of that book that may result from splitting the single volume into multiple volumes using techniques described herein, according to an embodiment of the invention.
Figure 10:
Figure 10:
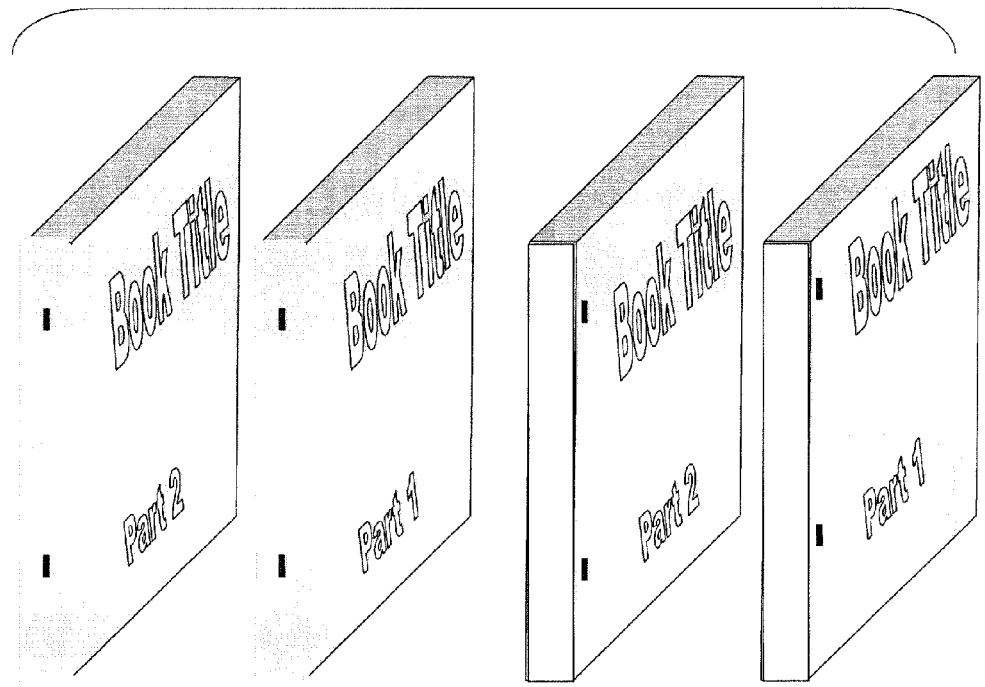

FIG. 10 illustrates some additional examples of a single-volume book and multiple volumes of that book that may result from splitting the single volume into multiple volumes using processes described herein, according to an embodiment of the invention. As shown, an original, single-volume "perfect bound" book may be split into volumes that are bound using binding techniques other than the binding technique that would be used to bind the original book. In one example shown, the resulting volumes are "saddle stitched" with a single "wraparound" cover sheet. In another example shown, the resulting volumes are dual stapled with separate front and back cover sheets. In both examples, the resulting volumes lack any printing on any spine, unlike the original representation of the book.

Figure 11:
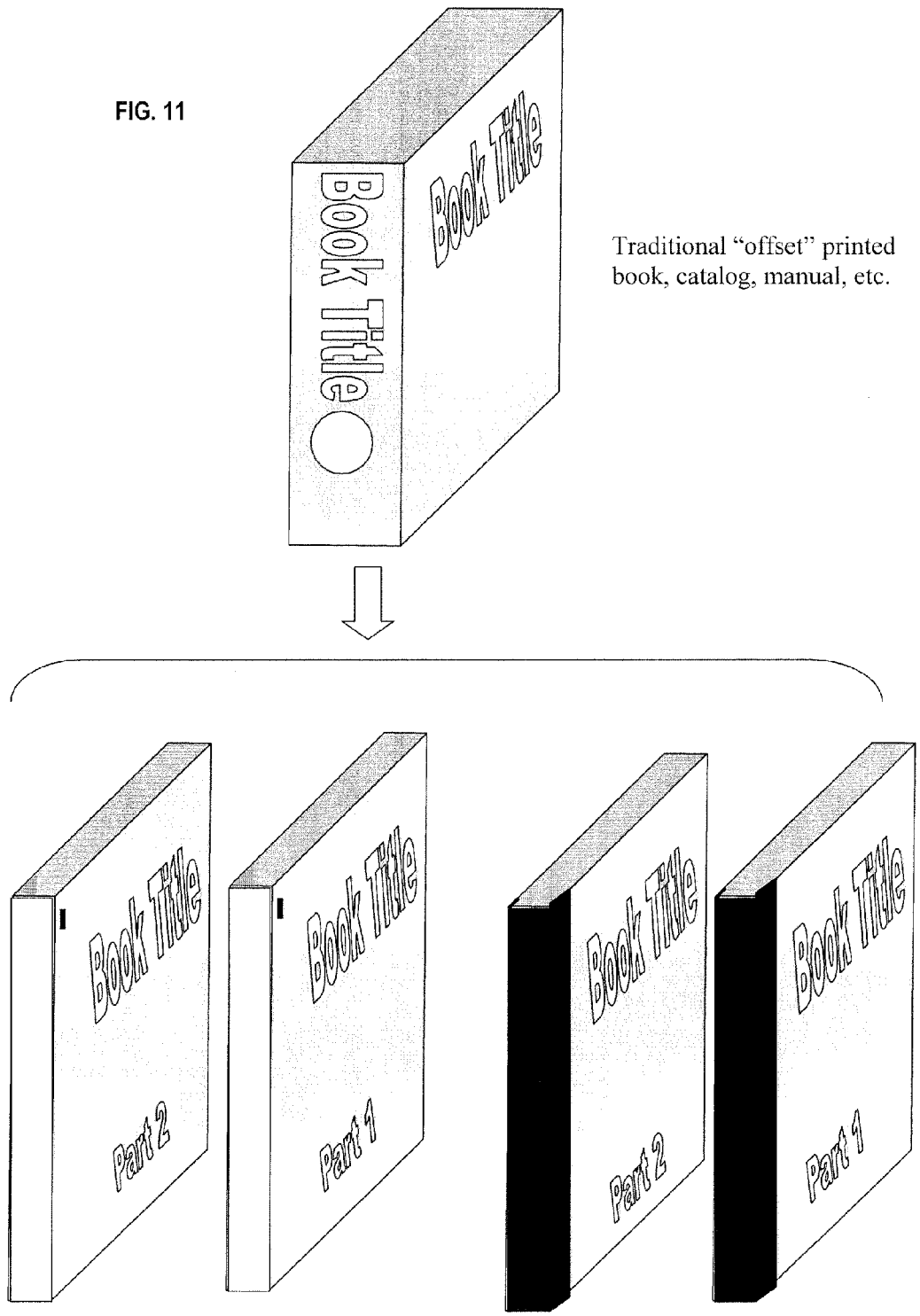
FIG. 11 illustrates some additional examples of a single-volume book and multiple volumes of that book that may result from splitting the single volume into multiple volumes using techniques described herein, according to an embodiment of the invention.

FIG. 11 illustrates some additional examples of a single-volume book and multiple volumes of that book that may result from splitting the single volume into multiple volumes using processes described herein, according to an embodiment of the invention. As shown, an original, single-volume "perfect bound" book may be split into volumes that are bound using binding techniques other than the binding technique that would be used to bind the original book. In one example shown, the resulting volumes are single stapled with separate front and back cover sheets. In another example shown, the resulting volumes are tape bound with separate front and back cover sheets. In both examples, the resulting volumes lack any printing on any spine, unlike the original representation of the book.

Figure 13:
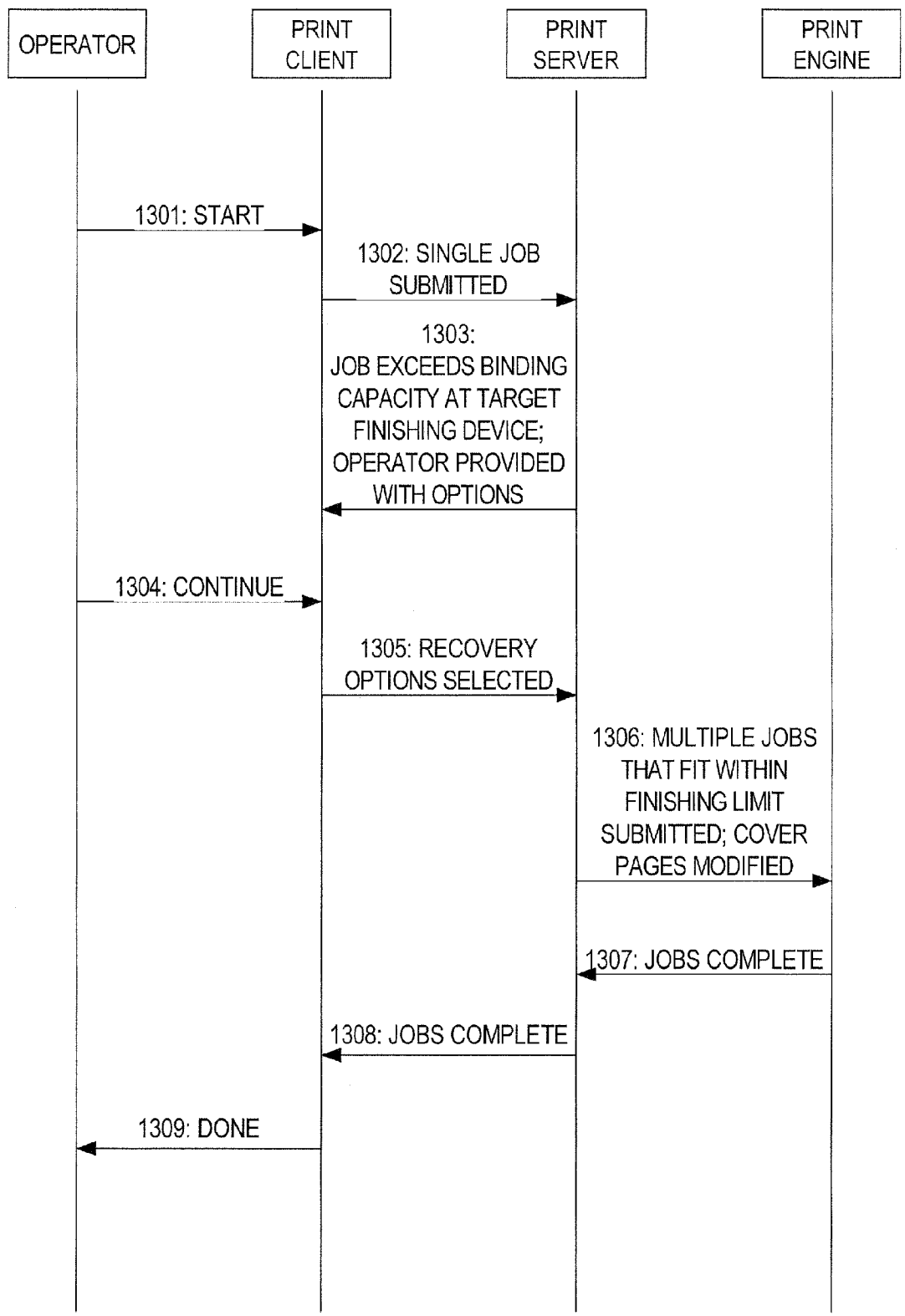
FIG. 13 is a sequence diagram that depicts an example of the operations that may be performed by an operator, a print client, a print server, and a print engine, according to an embodiment of the invention.

FIG. 13 is a sequence diagram that depicts an example of the operations that may be performed by an operator, a print client (e.g., a printer driver), a print server (or print controller) (e.g., a web server), and a print engine (e.g., a printing device, which may be integrated with a finishing device), according to an embodiment of the invention. The print client, print server, and print engine may be embodied in the same or in separate machines. In step 1301, an operator tells a print client to start a print job. In step 1302, the print client submits a single job to a print server. In step 1303, the print server advises the print client that the job exceeds the binding capacity at the target finishing device and provides the operator with options. In step 1304, the operator instructs the print client to continue. In step 1305, recovery options are selected. In step 1306, the print server submits, to a print engine, multiple jobs that fit within the finishing limit. Additionally, cover pages are modified. In step 1307, the print engine instructs the print server that the jobs are complete. In step 1308, the print server instructs the print client that the jobs are complete. In step 1309, the print client instructs the operator that the process is done.

Figure 14:
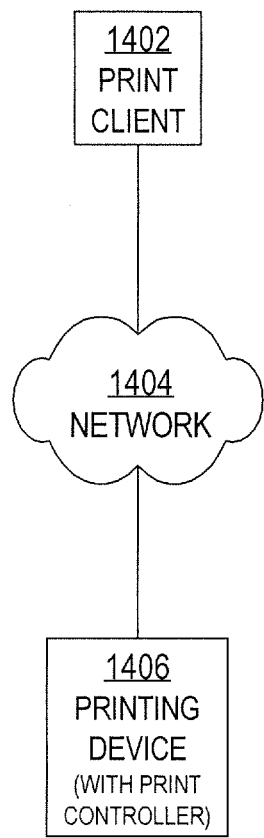
FIG. 14 is a block diagram that depicts an example of a system topology in which an embodiment of the invention may be implemented.

FIG. 14 is a block diagram that depicts an example of a system topology in which an embodiment of the invention may be implemented. The system comprises a print client 1402 (e.g., a printer driver), a network 1404 (e.g., a local area network, direct connection, and/or the Internet), and a printing device 1406 (which may be integrated with a finishing device such as a binding device). In this example, the automated mechanism that splits a digital version of a book into multiple volumes and/or adjusts attributes of a digital version of a book is embedded within printing device 1406.

Figure 15:
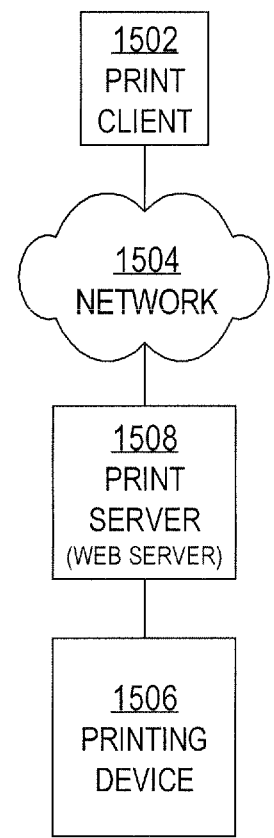
FIG. 15 is a block diagram that depicts an example of an alternative system topology in which an embodiment of the invention may be implemented.

FIG. 15 is a block diagram that depicts an example of an alternative system topology in which an embodiment of the invention may be implemented. The system comprises a print client 1502 (e.g., a printer driver), a network 1504 (e.g., a local area network, direct connection, and/or the Internet), a print server 1508 (e.g., a web server) and a printing device 1506 (which may be integrated with a finishing device such as a binding device). In this example, the automated mechanism that splits a digital version of a book into multiple volumes and/or adjusts attributes of a digital version of a book is embedded within web server 1508.

Figure 16:
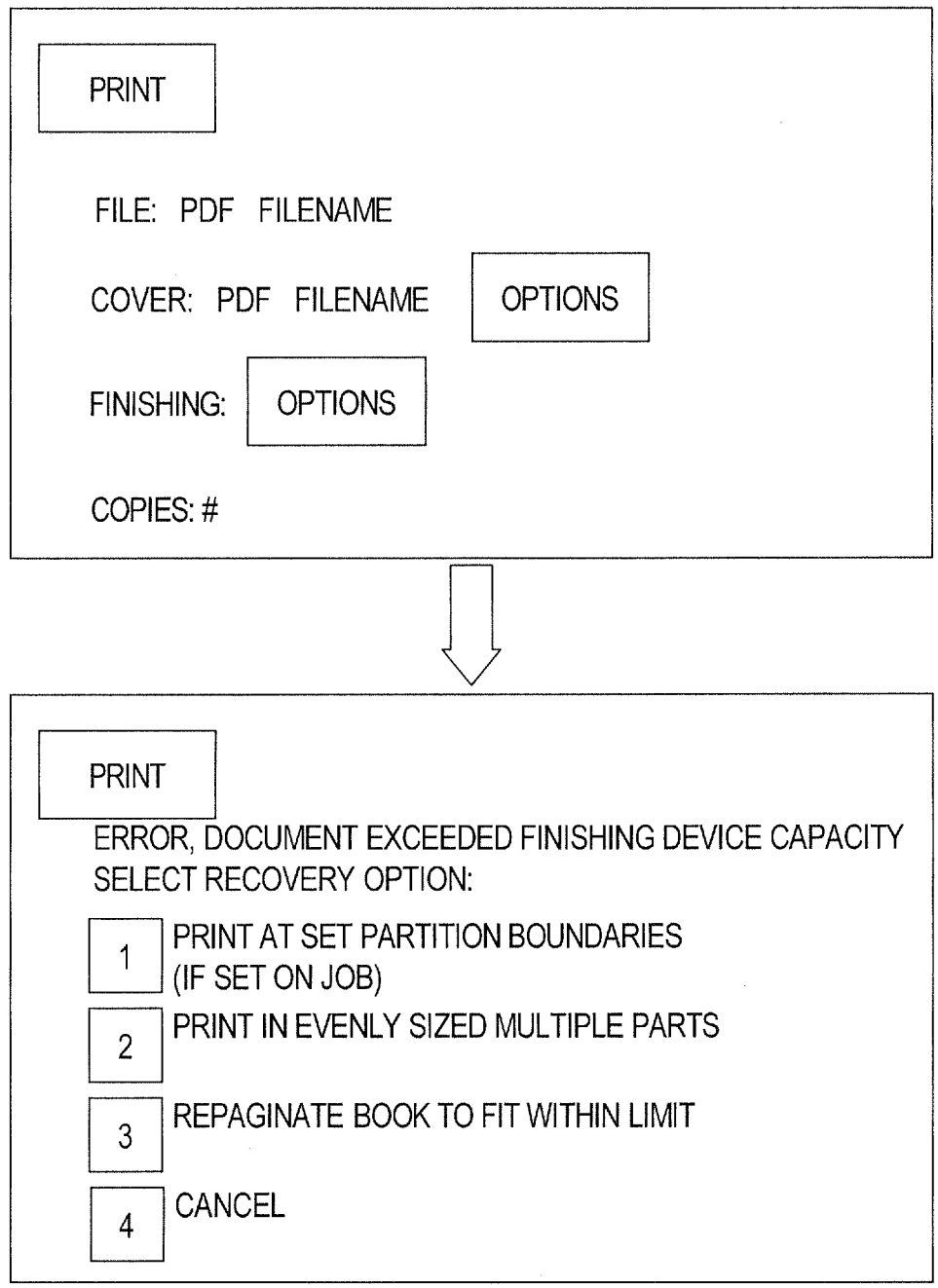
FIG. 16 illustrates example user interfaces through which a user can select options for printing a book when the book is determined to be too thick for a finishing device to handle, according to an embodiment of the invention.

FIG. 16 illustrates example user interfaces through which a user can select options for printing a book when the book is determined to be too thick for a finishing device to handle, according to an embodiment of the invention. In a first user dialog shown at the top of FIG. 16, a user is asked to specify a filename for the digital version of the book to be printed and finished, a filename for the digital version of the book's cover, and a number of copies of the book to be printed. Optionally, the user may specify options related to the cover and options related to the finishing process.

In response to a determination by the automated mechanism that the digital version of the book cannot be handled by a specified finishing device (e.g., because the printed copy of the version will be too thick for the specified finishing device to bind), a second user dialog such as is shown at the bottom of FIG. 16 may be displayed to the user. This second user dialog informs the user that the specified document exceeds the capacity of the specified finishing device. The second user dialog allows the user to select from among several options in order to recover from this problem. In the example shown, the user is given the options of (1) printing the book as a multi-volume set using partition boundaries (e.g., suggested digital volume markers) embedded in the digital version of the book, if any such partition boundaries have been set, (2) printing the book as a multi-volume set in which each of the volumes is of approximately the same thickness (while preventing chapters and pages from being split between volumes), (3) repaginate the book to fit within the specified printing device's limits— for example, by adjusting attributes of the digital version of the book as described above, or (4) cancel the printing of the book entirely.

Figure 17:
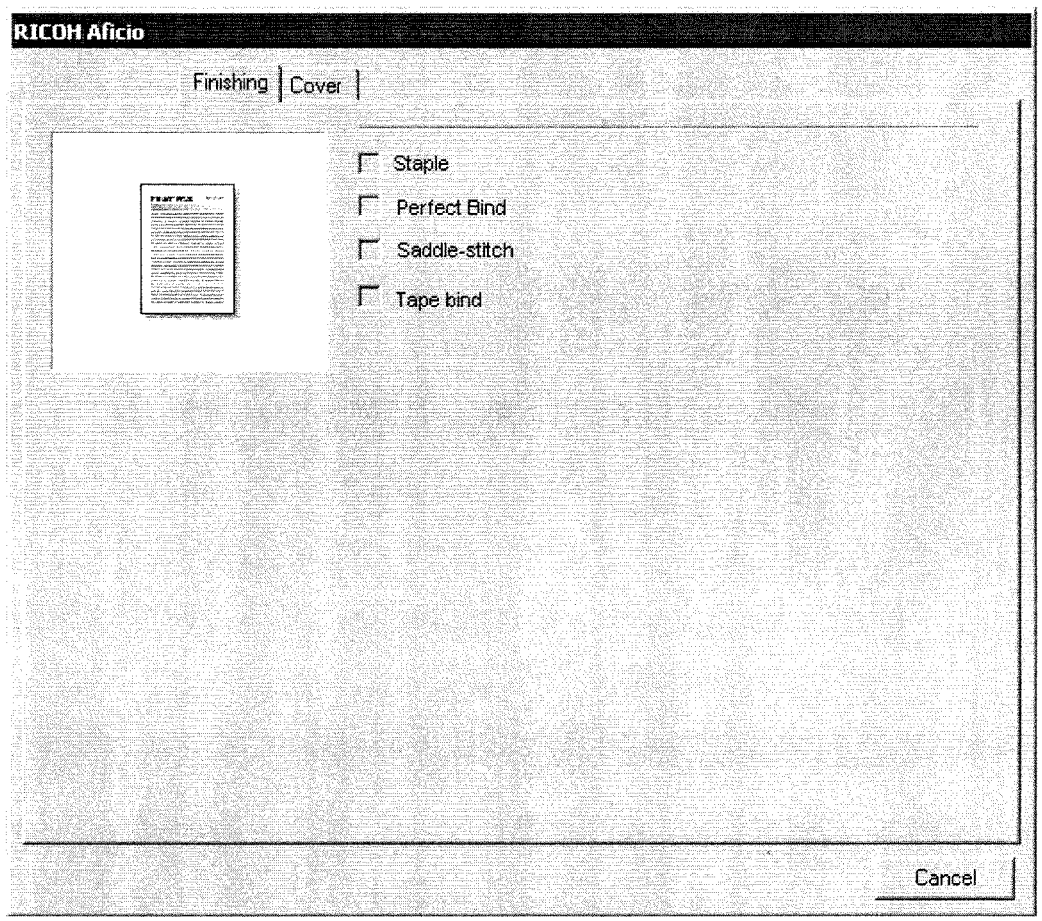
FIG. 17 illustrates an example user interface through which a user can select options for finishing (e.g., binding) a book printed from a digital version, according to an embodiment of the invention.

FIG. 17 illustrates an example user interface through which a user can select options for finishing (e.g., binding) a book printed from a digital version, according to an embodiment of the invention. The user interface shown might be displayed to a user in response to the user clicking on the "options" button next to "finishing" as shown in the first dialog of FIG. 16, for example. In the example shown, a user can select from among different binding options such as "staple," "perfect bind," "saddle stitch," and "tape bind."

Figure 18:
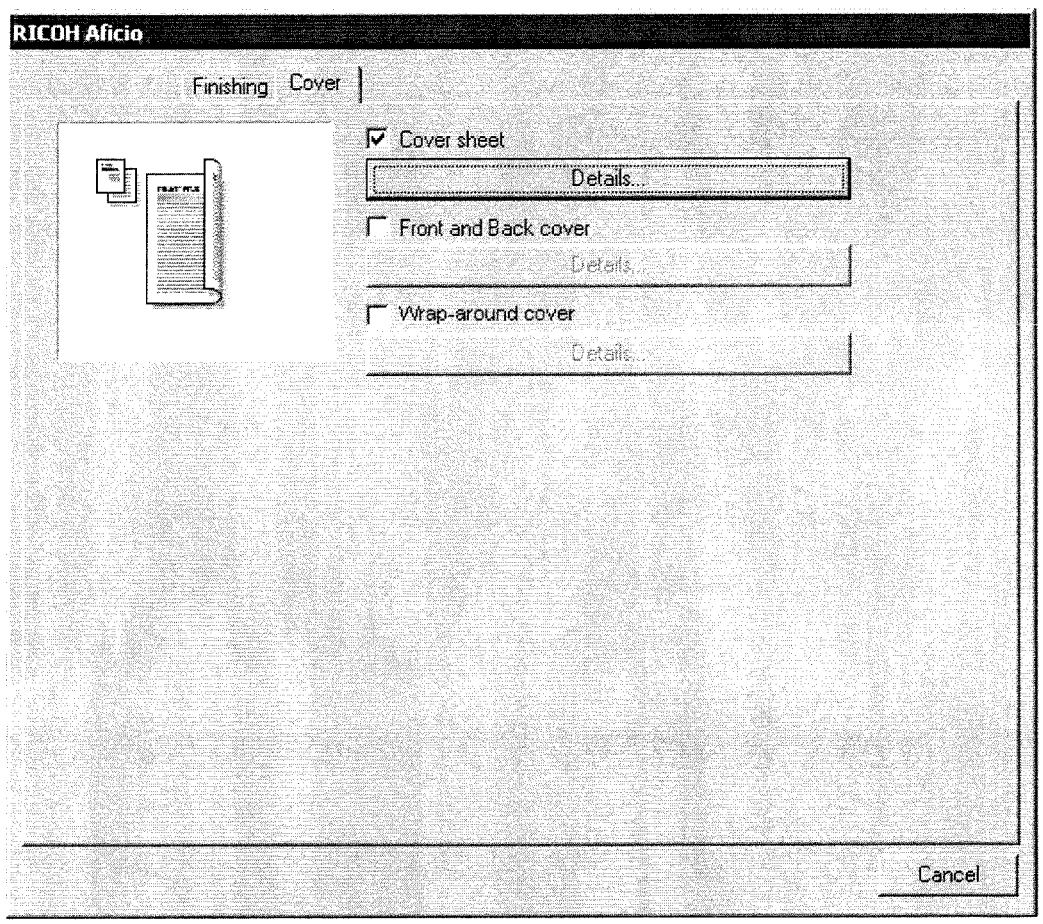
FIG. 18 illustrates an example user interface through which a user can select options for specifying the content of a customized cover of a book that is to be printed from a digital version, according to an embodiment of the invention.

FIG. 18 illustrates an example user interface through which a user can select options for specifying the content of a customized cover of a book that is to be printed from a digital version, according to an embodiment of the invention. The user interface shown might be displayed to a user in response to the user clicking on the "options" button next to "cover" as shown in the first dialog of FIG. 16, for example. In the example shown, a user can specify (a) whether a cover sheet will be printed for the book, (b) whether the cover will consist of separate front and back cover sheets and (c) whether the cover will consist of a single "wraparound" cover sheet. The types of cover sheets that may be selected by the user may be limited based on the type of binding/finishing that the user has specified (e.g., via the user interface shown in FIG. 17) since some cover options may be incompatible with some binding/finishing techniques. In the example shown, the user interface additionally comprises buttons which the user can select in order to set details which pertain to the cover sheet generally, front and back cover sheets specifically, and/or a "wraparound" cover sheet specifically.

Figure 19:
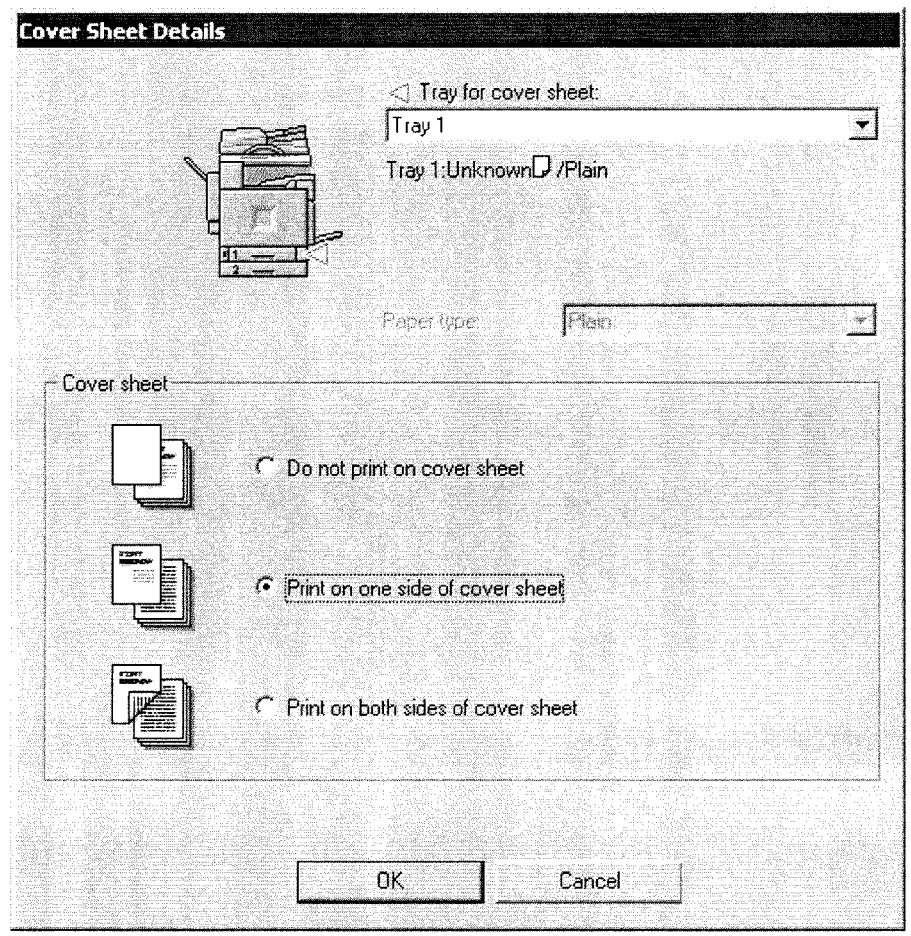
FIG. 19 illustrates an example user interface through which a user can set detailed attributes for a customized cover of a book that is to be printed from a digital version, according to an embodiment of the invention.

FIG. 19 illustrates an example user interface through which a user can set detailed attributes for a customized cover of a book that is to be printed from a digital version, according to an embodiment of the invention. This user interface may be presented to a user in response to that user clicking on one of the "details" buttons shown in FIG. 18, for example. In the example shown, the user interface includes a drop-down box by which a user can select a printing device's input tray from which the printing device should draw media for the book's cover. The user interface may indicate the type of media that is currently contained in the selected input tray. Additionally, the user interface may contain a drop-down box that allows a user to specify the type of media onto which the cover should be printed; if such a media type is specified, then the user interface may automatically set the input tray to be the input tray that currently contains that type of media, if any input tray currently does.

Additionally, in the example shown, the user interface allows a user to select from a set of options pertaining to how text and/or graphics are to be printed on the cover sheet. In the example shown, these options include (1) do not print on the cover sheet, (2) print on only one side of the cover sheet, and (3) print on both sides of the cover sheet.

Implementation Mechanisms

Figure 20:
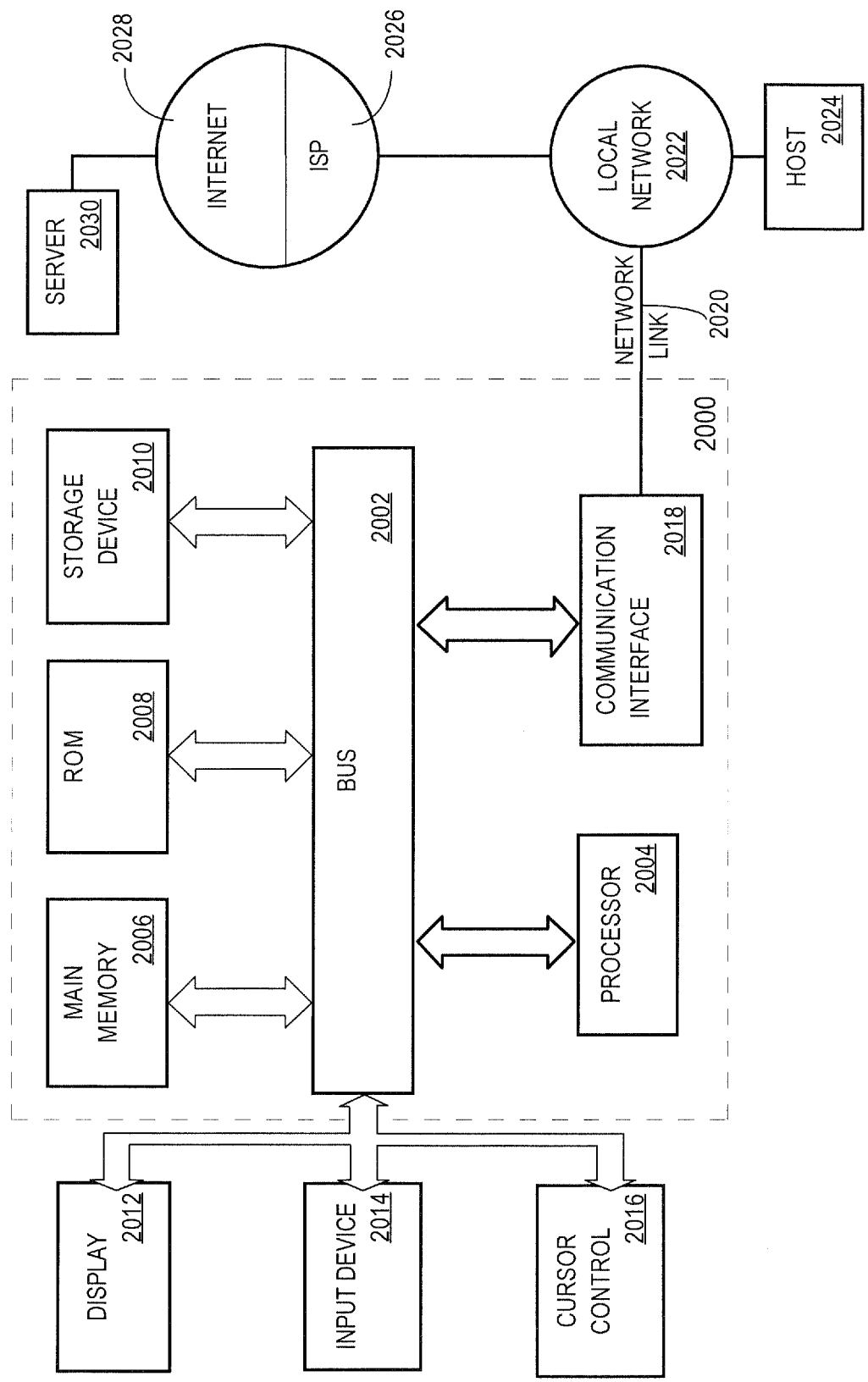
FIG. 20 is a block diagram that depicts a printing device upon which an embodiment of the invention may be implemented.

FIG. 20 is a block diagram that depicts a computer system 2000 upon which an embodiment of the invention may be implemented. Computer system 2000 includes a bus 2002 or other communication mechanism for communicating information, and a processor 2004 coupled with bus 2002 for processing information. Computer system 2000 also includes a main memory 2006, such as a random access memory (RAM) or other dynamic storage device, coupled to bus 2002 for storing information and instructions to be executed by processor 2004. Main memory 2006 also may be used for storing temporary variables or other intermediate information during execution of instructions to be executed by processor 2004. Computer system 2000 further includes a read only memory (ROM) 2008 or other static storage device coupled to bus 2002 for storing static information and instructions for processor 2004. A storage device 2010, such as a magnetic disk or optical disk, is provided and coupled to bus 2002 for storing information and instructions.

Computer system 2000 may be coupled via bus 2002 to a display 2012, such as a liquid crystal display (LCD), for displaying information to a user. An input device 2014, including alphanumeric and other keys, is coupled to bus 2002 for communicating information and command selections to processor 2004. Another type of user input device is cursor control 2016, such as a mouse, trackball, stylus, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane.

The invention is related to the use of computer system 2000 in a wireless communications architecture. According to one embodiment of the invention, wireless communications are provided by computer system 2000 in response to processor 2004 executing one or more sequences of one or more instructions contained in main memory 2006. Such instructions may be read into main memory 2006 from another computer-readable medium, such as storage device 2010. Execution of the sequences of instructions contained in main memory 2006 causes processor 2004 to perform the process steps described herein. One or more processors in a multi-processing arrangement may also be employed to execute the sequences of instructions contained in main memory 2006. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2004 for execution. Such a medium may take many forms, including but not limited to, non-volatile media, volatile media, and transmission media. Non-volatile media includes, for example, optical or magnetic disks, such as storage device 2010. Volatile media includes dynamic memory, such as main memory 2006. Transmission media includes coaxial cables, copper wire and fiber optics, including the wires that comprise bus 2002. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 2004 for execution. For example, the instructions may initially be carried on a magnetic disk of a remote computer. The remote computer can load the instructions into its dynamic memory and send the instructions over a telephone line using a modem. A modem local to computer system 2000 can receive the data on the telephone line and use an infrared transmitter to convert the data to an infrared signal. An infrared detector coupled to bus 2002 can receive the data carried in the infrared signal and place the data on bus 2002. Bus 2002 carries the data to main memory 2006, from which processor 2004 retrieves and executes the instructions. The instructions received by main memory 2006 may optionally be stored on storage device 2010 either before or after execution by processor 2004.

Computer system 2000 also includes a communication interface 2018 coupled to bus 2002. Communication interface 2018 provides a two-way data communication coupling to a network link 2020 that is connected to a local network 2022. For example, communication interface 2018 may be an integrated services digital network (ISDN) card or a modem to provide a data communication connection to a corresponding type of telephone line. As another example, communication interface 2018 may be a LAN card to provide a data communication connection to a compatible LAN. Wireless links may also be implemented. In any such implementation, communication interface 2018 sends and receives electrical, electromagnetic or optical signals that carry digital data streams representing various types of information.

Network link 2020 typically provides data communication through one or more networks to other data devices. For example, network link 2020 may provide a connection through local network 2022 to a host computer 2024 or to data equipment operated by an Internet Service Provider (ISP) 2026. ISP 2026 in turn provides data communication services through the worldwide packet data communication network now commonly referred to as the Internet 2028. Local network 2022 and Internet 2028 both use electrical, electromagnetic or optical signals that carry digital data streams. The signals through the various networks and the signals on network link 2020 and through communication interface 2018, which carry the digital data to and from computer system 2000, are example forms of carrier waves transporting the information.

Computer system 2000 can send messages and receive data, including program code, through the network(s), network link 2020 and communication interface 2018. In the Internet example, a server 2030 might transmit a requested code for an application program through Internet 2028, ISP 2026, local network 2022 and communication interface 2018. In accordance with the invention, one such downloaded application provides for configuring a monitoring system to monitor selected network elements as described herein. Processor 2004 may execute the received code as it is received and/or stored in storage device 2010 or other non-volatile storage for later execution. In this manner, computer system 2000 may obtain application code in the form of a carrier wave.

In the foregoing specification, specific embodiments of the invention have been described. However, various modifications and changes may be made to such embodiments of the invention without departing from the broader spirit and scope of the invention. The specification and drawings are, accordingly, to be regarded in an illustrative rather than a restrictive sense.

What is claimed is:

1. A computer-implemented method for ordering a book, the computer-implemented method comprising:
receiving, over a network, a request that identifies a book;
in response to receiving the request that identifies the book, sending, over the network, data that represents two or more different options for ordering the book, wherein the two or more different options for ordering the book include at least an option for a digital version of the book and at least one of a previously manufactured book or a book that is manufactured on demand;
receiving, over the network, data that indicates a user selection of a particular option for ordering the book from the two or more different options for ordering the book;
determining whether the user selection of the particular option for ordering the book is a book that is manufactured on demand;
in response to determining that the user selection of the particular option for ordering the book is a book that is manufactured on demand, then manufacturing the book in accordance with one or more manufacturing options for manufacturing the book, the one or more manufacturing options for manufacturing the book including one or more of a type of cover, a type of binding, or a size for the book; and
in response to determining that the user selection of the particular option for ordering the book is not a book that is manufactured on demand, then after receiving the data that indicates the user selection of the particular option for ordering the book from the two or more different options for ordering the book, fulfilling an order for the book in accordance with the particular option;
wherein one or more of the steps are performed by one or more computing devices.

2. The computer-implemented method of claim 1, wherein one or more attributes specified in the digital version of the book include one or more of paper type, paper size, font type, font size, margin size, or line spacing.

3. The computer-implemented method of claim 1, further comprising determining, based upon a designated finishing device on which the order for the book will be fulfilled, one or more revised attribute values for one or more attributes specified in the digital version of the book.

4. The computer-implemented method of claim 3, wherein determining, based upon a designated finishing device on which the order for the book will be fulfilled, one or more revised attribute values for one or more attributes specified in the digital version of the book includes:
determining that the book will exceed a maximum thickness of the designated finishing device, and
in response to determining that the book will exceed a maximum thickness of the designated finishing device, determining the one or more revised attribute values for the one or more attributes specified in the digital version of the book to specify manufacturing the book as a multi-volume version of the book.

5. A computer-implemented method for ordering a book, the computer-implemented method comprising:
receiving, over a network, a request that identifies a book;
in response to receiving the request that identifies the book, sending, over the network, data that represents two or more different options for ordering the book, wherein the two or more different options for ordering the book include at least an option for a digital version of the book and at least one of a previously manufactured book or a book that is manufactured on demand;
receiving, over the network, data that indicates a user selection of a particular option for ordering the book from the two or more different options for ordering the book;
determining whether the user selection of the particular option for ordering the book is a book that is manufactured on demand;
in response to determining that the user selection of the particular option for ordering the book is a book that is manufactured on demand, then manufacturing the book including one or more of manufacturing the book as a multiple-volume book or manufacturing the book as a repaginated book; and
in response to determining that the user selection of the particular option for ordering the book is not a book that is manufactured on demand, then after receiving the data that indicates the user selection of the particular option for ordering the book from the two or more different options for ordering the book, fulfilling an order for the book in accordance with the particular option;
wherein one or more of the steps are performed by one or more computing devices.

6. A computer-implemented method for ordering a book, the computer-implemented method comprising:
receiving, over a network, a request that identifies a book;
in response to receiving the request that identifies the book, sending, over the network, data that represents two or more different options for ordering the book, wherein at least one option for ordering the book from the two or more different options for ordering the book is an option for ordering a digital version of the book;
determining whether one option for ordering the book from the two or more different options for ordering the book is an option for ordering a manufactured book;
in response to determining that the one option for ordering the book from the two or more options for ordering the book is an option for ordering a manufactured book, then:
retrieving preview data which, when processed on a graphical user interface, provides a visual depiction of the manufactured book, and
transmitting the preview data over the network to be viewed by the user;
receiving, over the network, data that indicates a user selection of a particular option for ordering the book from the two or more different options for ordering the book; and
after receiving the data that indicates the user selection of the particular option for ordering the book from the two or more different options for ordering the book, fulfilling an order for the book in accordance with the particular option;
wherein one or more of the steps are performed by one or more computing devices.

7. One or more non-transitory computer-readable media storing instructions which, when processed by one or more processors, cause:
receiving, over a network, a request that identifies a book;
in response to receiving the request that identifies the book, sending, over the network, data that represents two or more different options for ordering the book, wherein the two or more different options for ordering the book include at least an option for a digital version of the book and at least one of a previously manufactured book or a book that is manufactured on demand;

receiving, over the network, data that indicates a user selection of a particular option for ordering the book from the two or more different options for ordering the book;

determining whether the user selection of the particular option for ordering the book is a book that is manufactured on demand;

in response to determining that the user selection of the particular option for ordering the book is a book that is manufactured on demand, then manufacturing the book in accordance with more manufacturing options for manufacturing the book, the one or more manufacturing options for manufacturing the book including one or more of a type of cover, a type of binding, or a size for the book; and in response to determining that the user selection of the particular option for ordering the book is not a book that is manufactured on demand, then after receiving the data that indicates the user selection of the particular option for ordering the book from the two or more different options for ordering the book, fulfilling an order for the book in accordance with the particular option.

8. The one or more non-transitory computer-readable media of claim 7, wherein one or more attributes specified in the digital version of the book include one or more of paper type, paper size, font type, font size, margin size, or line spacing.

9. The one or more non-transitory computer-readable media of claim 7, further comprising determining, based upon a designated finishing device on which the order for the book will be fulfilled, one or more revised attribute values for one or more attributes specified in the digital version of the book.

10. The one or more non-transitory computer-readable media of claim 9, wherein determining, based upon a designated finishing device on which the order for the book will be fulfilled, one or more revised attribute values for one or more attributes specified in the digital version of the book includes:

determining that the book will exceed a maximum thickness of the designated finishing device, and in response to determining that the book will exceed a maximum thickness of the designated finishing device, determining the one or more revised attribute values for the one or more attributes specified in the digital version of the book to specify manufacturing the book as a multi-volume version of the book.

11. One or more non-transitory computer-readable media storing instructions which, when processed by one or more processors, cause:

receiving, over a network, a request that identifies a book;

in response to receiving the request that identifies the book, sending, over the network, data that represents two or more different options for ordering the book, wherein the two or more different options for ordering the book include at least an option for a digital version of the book and at least one of a previously manufactured book or a book that is manufactured on demand;

receiving, over the network, data that indicates a user selection of a particular option for ordering the book from the two or more different options for ordering the book;

determining whether the user selection of the particular option for ordering the book is a book that is manufactured on demand;

in response to determining that the user selection of the particular option for ordering the book is a book that is manufactured on demand, then manufacturing the book including one or more of manufacturing the book as a multiple-volume book or manufacturing the book as a repaginated book; and in response to determining that the user selection of the particular option for ordering the book is not a book that is manufactured on demand, then after receiving the data that indicates the user selection of the particular option for ordering the book from the two or more different options for ordering the book, fulfilling an order for the book in accordance with the particular option.

12. An apparatus comprising:

one or more processors; and a memory storing instructions which, when processed by one or more processors, cause:

receiving, over a network, a request that identifies a book;

in response to receiving the request that identifies the book, sending, over the network, data that represents two or more different options for ordering the book, wherein the two or more different options for ordering the book include at least an option for a digital version of the book and at least one of a previously manufactured book or a book that is manufactured on demand;

receiving, over the network, data that indicates a user selection of a particular option for ordering the book from the two or more different options for ordering the book;

determining whether the user selection of the particular option for ordering the book is a book that is manufactured on demand;

in response to determining that the user selection of the particular option for ordering the book is a book that is manufactured on demand, then manufacturing the book in accordance with one or more manufacturing options for manufacturing the book, the one or more manufacturing options including one or more of a type of cover, a type of binding, or a size for the book; and in response to determining that the user selection of the particular option for ordering the book is not a book that is manufactured on demand, then after receiving the data that indicates the user selection of the particular option for ordering the book from the two or more different options for ordering the book, fulfilling an order for the book in accordance with the particular option.

13. The apparatus of claim 12, wherein the memory stores additional instructions which, when processed by the one or more processors, causes: determining, based upon a designated finishing device on which the order for the book will be fulfilled, one or more revised attribute values for one or more attributes specified in the digital version of the book by:

determining that the book will exceed a maximum thickness of the designated finishing device, and in response to determining that the book will exceed a maximum thickness of the designated finishing device, determining the one or more revised attribute values for the one or more attributes specified in the digital version of the book to specify manufacturing the book as a multi-volume version of the book.

* * * * *